United States Patent
Nakamura et al.

(10) Patent No.: US 8,346,462 B2
(45) Date of Patent: Jan. 1, 2013

(54) MALFUNCTION DETECTION APPARATUS AND MALFUNCTION DETECTION METHOD FOR AN EGR SYSTEM

(75) Inventors: Yoshitaka Nakamura, Toyota (JP); Hiroshi Sawada, Gotenba (JP); Toru Kidokoro, Hadano (JP); Shinya Taira, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 12/677,194

(22) PCT Filed: Aug. 28, 2009

(86) PCT No.: PCT/JP2009/065093
§ 371 (c)(1),
(2), (4) Date: Mar. 9, 2010

(87) PCT Pub. No.: WO2011/024294
PCT Pub. Date: Mar. 3, 2011

(65) Prior Publication Data
US 2012/0095664 A1    Apr. 19, 2012

(51) Int. Cl.
G06F 19/00 (2011.01)
F02M 25/07 (2006.01)
F02B 47/08 (2006.01)
F02B 33/44 (2006.01)
G01M 15/00 (2006.01)

(52) U.S. Cl. ............... 701/114; 60/605.2; 123/568.16; 73/114.74; 701/108

(58) Field of Classification Search ............. 123/568.12, 123/568.16, 568.21; 701/107, 108, 114; 60/605.2; 73/114.74
See application file for complete search history.

(56) References Cited

U.S. PATENT DOCUMENTS
7,926,272 B2 * 4/2011 Takemoto ............ 60/605.2
(Continued)

FOREIGN PATENT DOCUMENTS
JP    A 63-227938    9/1988
(Continued)

OTHER PUBLICATIONS

International Search Report issued in corresponding International Application No. PCT/JP2009/065093, mailed Oct. 20, 2009 (with English-language translation).

*Primary Examiner* — Willis R Wolfe, Jr.
(74) *Attorney, Agent, or Firm* — Oliff & Berridge, PLC

(57) ABSTRACT

A determination is made more simply as to a malfunction of a low pressure EGR device that supplies an EGR gas from a low pressure EGR passage connecting between an exhaust passage at a location downstream of a turbine and an intake passage. Provision is made for a high pressure EGR device that connects between the exhaust passage at a location upstream of the turbine and the intake passage, the low pressure EGR device that connects between the exhaust passage at a location downstream of the turbine and the intake passage, and a detection unit that detects a malfunction of the low pressure EGR device from the degree of opening of a high pressure EGR valve at the time when the EGR gas is supplied from both the high pressure EGR device and the low pressure EGR device, and at the time when the high pressure EGR valve of the high pressure EGR device is controlled in a feedback manner so as to direct an amount of EGR gas in a cylinder toward a target range of the amount of EGR gas, while carrying out open loop control of a low pressure EGR valve of the low pressure EGR device.

14 Claims, 16 Drawing Sheets

U.S. PATENT DOCUMENTS

| | | | | |
|---|---|---|---|---|
| 8,001,953 B2 * | 8/2011 | Murata et al. | ............ | 123/568.21 |
| 8,196,404 B2 * | 6/2012 | Onishi et al. | ................. | 60/605.2 |
| 8,220,443 B2 * | 7/2012 | Murata et al. | ................. | 60/605.2 |
| 2007/0246028 A1 | 10/2007 | Fujita et al. | | |
| 2010/0031939 A1 * | 2/2010 | Ono | ............................ | 60/605.2 |
| 2012/0095664 A1 * | 4/2012 | Nakamura et al. | ........... | 60/605.2 |

FOREIGN PATENT DOCUMENTS

| | | | | |
|---|---|---|---|---|
| JP | A 2007-292028 | 11/2007 | | |
| JP | A 2007-315371 | 12/2007 | | |
| JP | 2008008207 A * | 1/2008 | ................... | 60/605.2 |
| JP | A 2008-038627 | 2/2008 | | |
| JP | A 2008-051022 | 3/2008 | | |
| JP | A 2008-106706 | 5/2008 | | |
| JP | 2008202423 A * | 9/2008 | ................... | 60/605.2 |
| JP | A 2008-223554 | 9/2008 | | |
| JP | A 2009-074459 | 4/2009 | | |
| WO | WO 2008087515 A2 * | 7/2008 | ................... | 60/605.2 |

* cited by examiner

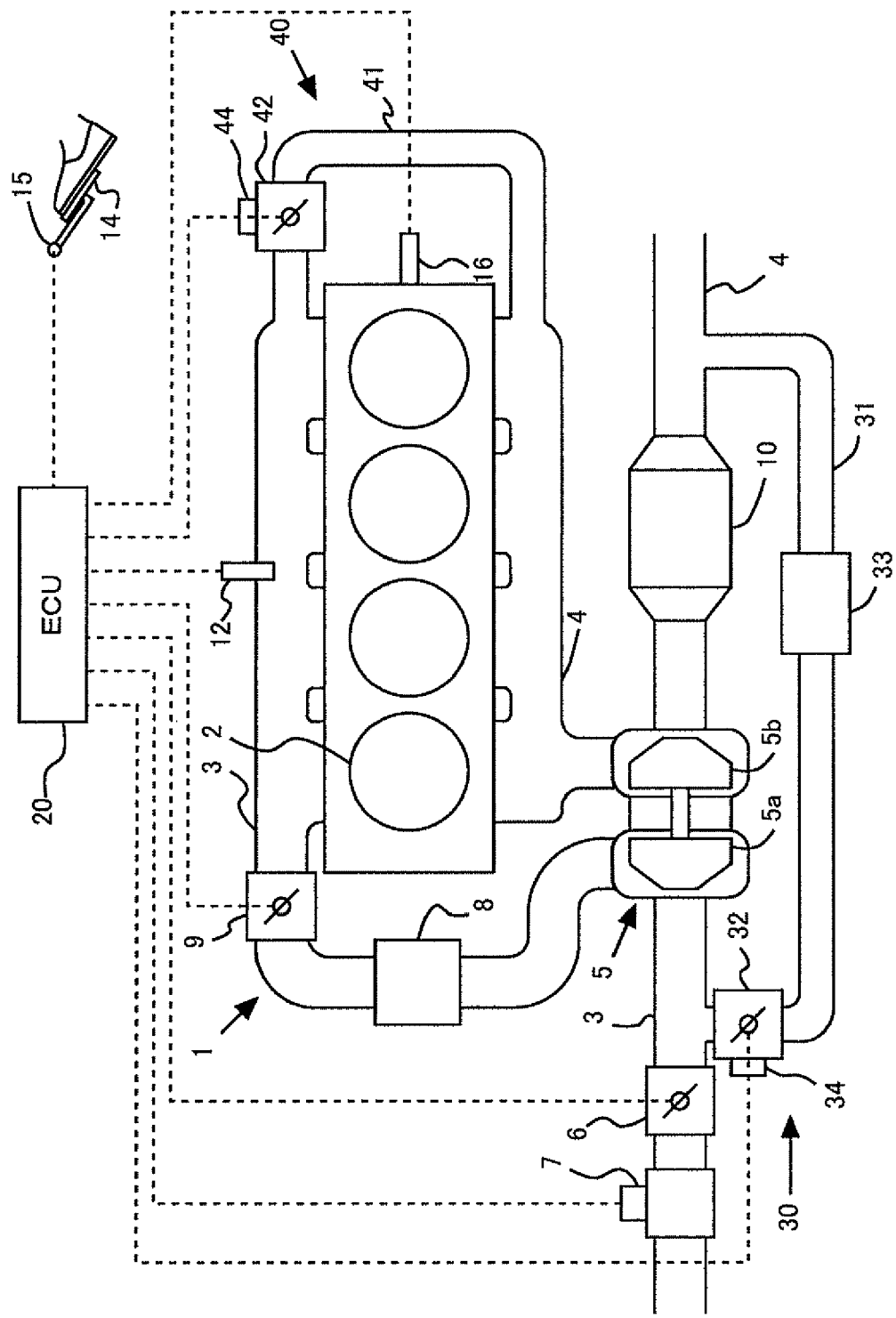
[Fig. 1]

[Fig. 2]
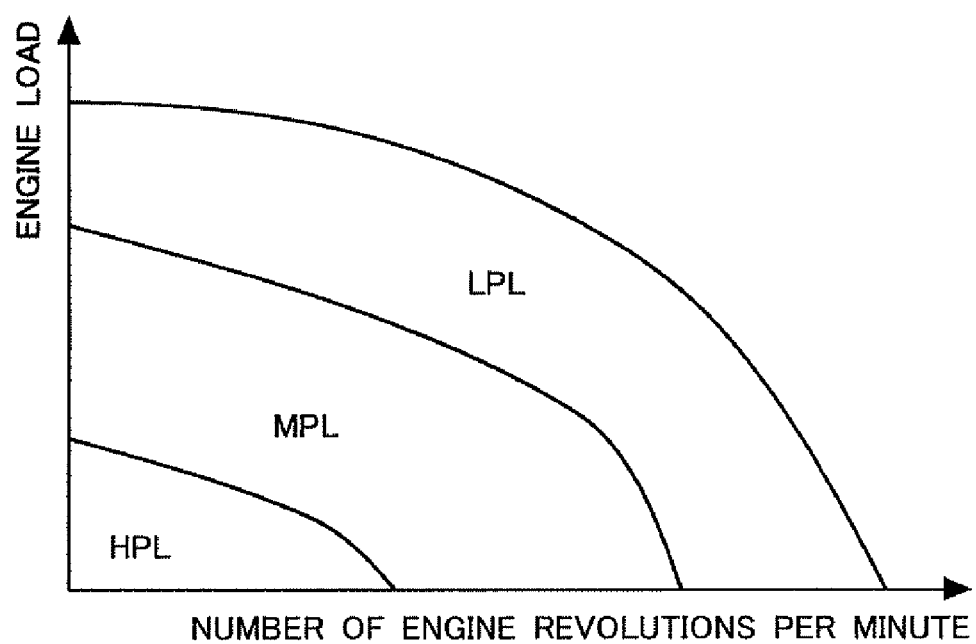

[Fig. 3]

| CONTROL MODE | AMOUNT OF CONTROL | CONTROL METHOD | |
|---|---|---|---|
| | | HIGH PRESSURE EGR VALVE | LOW PRESSURE EGR VALVE |
| HPL | AMOUNT OF INTAKE AIR | FEEDBACK | FULLY CLOSED |
| MPL | AMOUNT OF INTAKE AIR | FEEDBACK | OPEN LOOP |
| LPL | AMOUNT OF INTAKE AIR | FULLY CLOSED | FEEDBACK |

[Fig. 4]
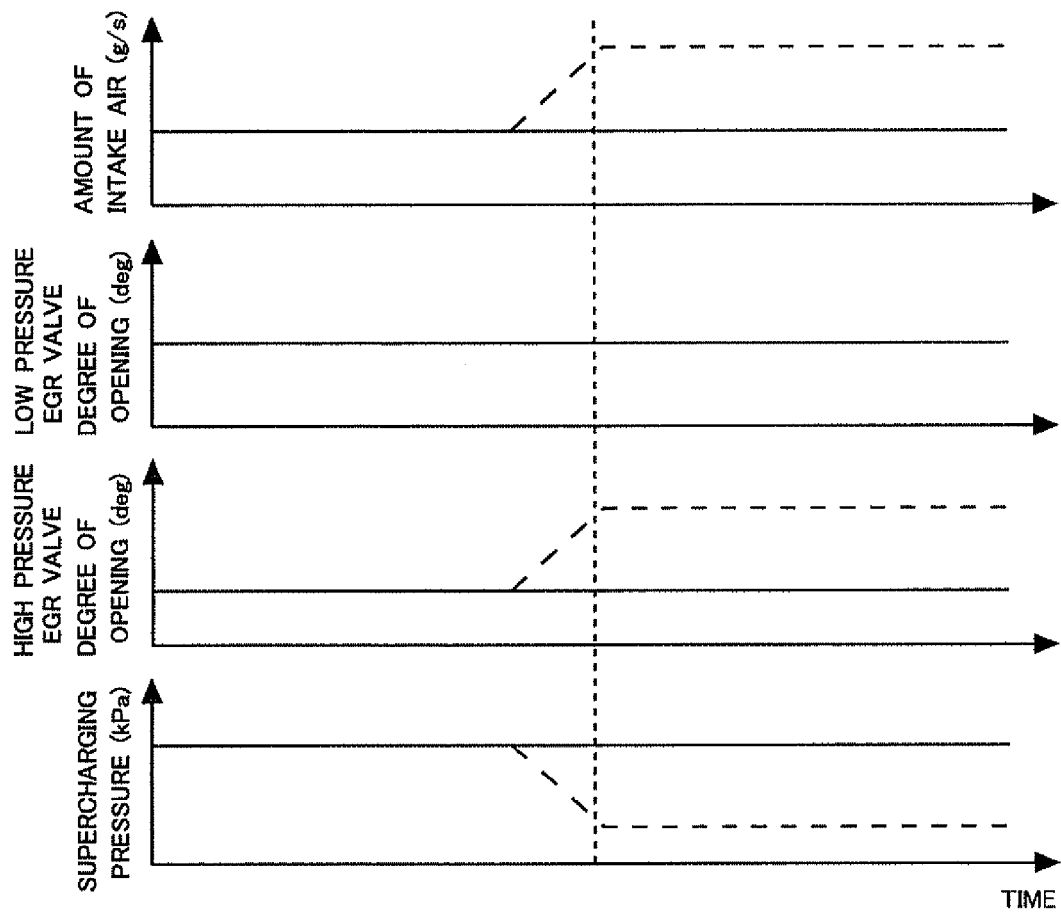

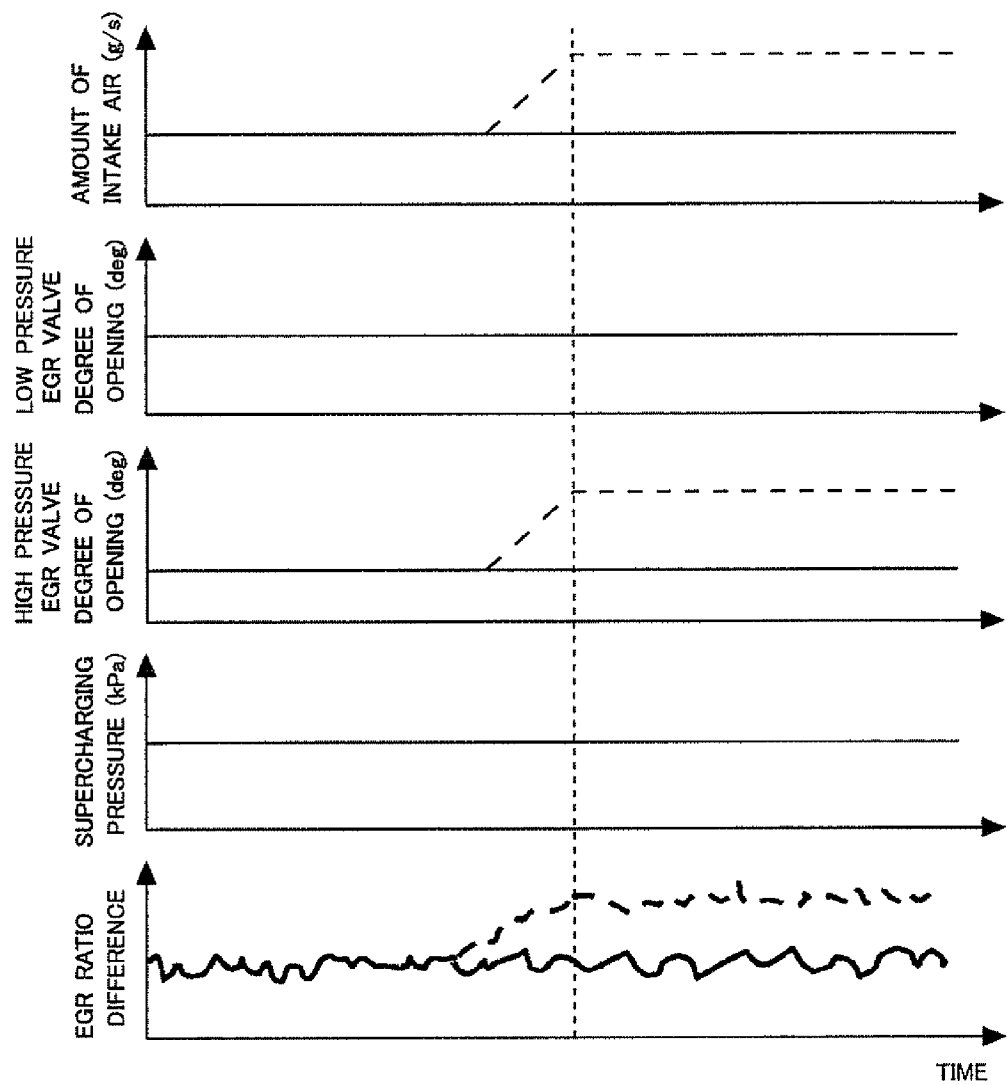
[Fig. 5]

[Fig. 6]
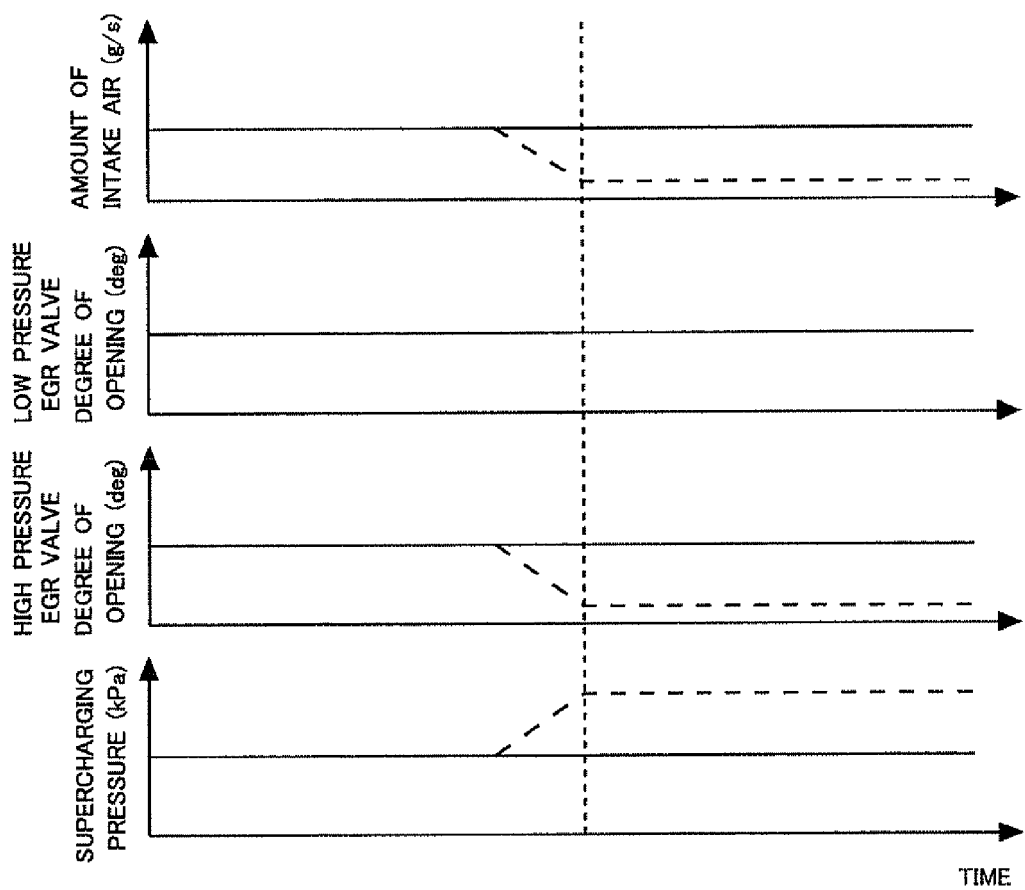

[Fig. 7]
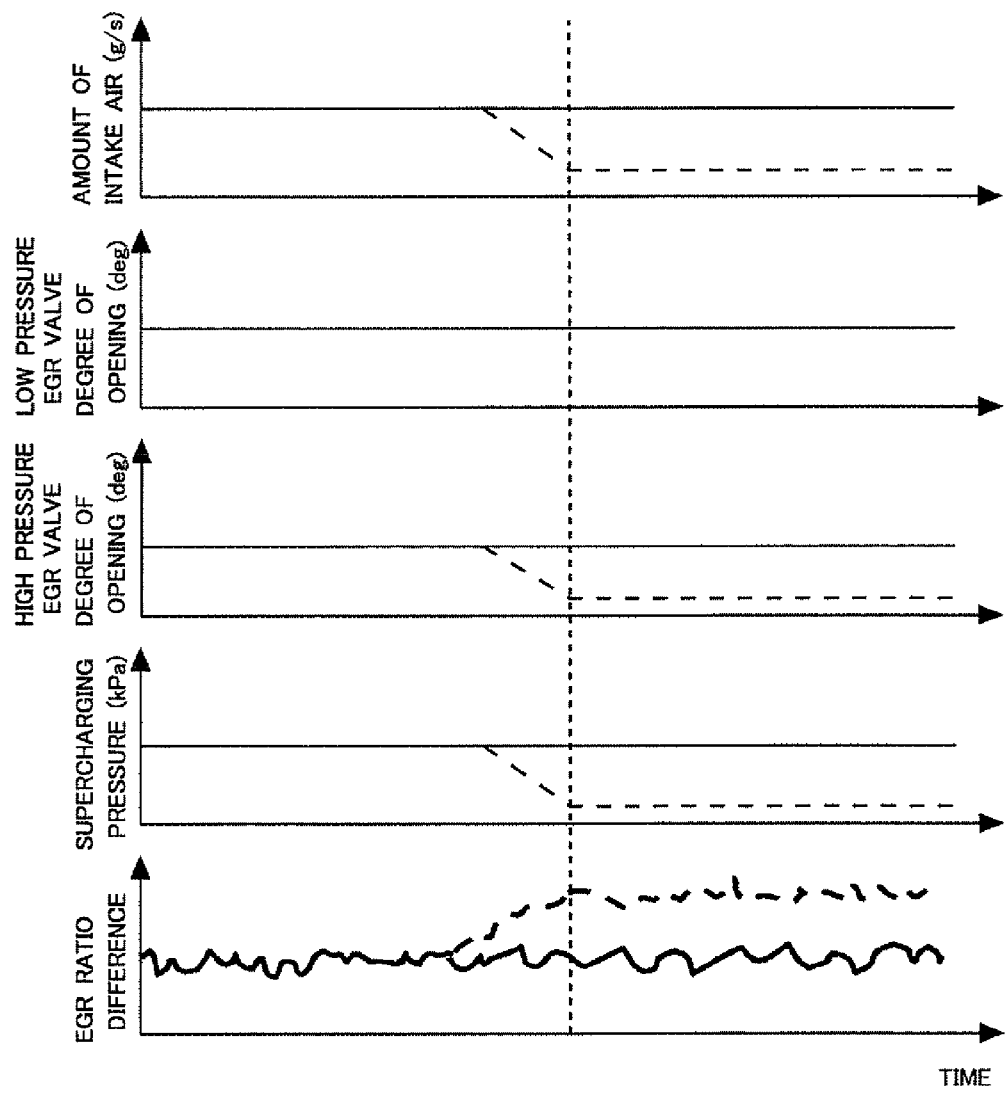

[Fig. 8]
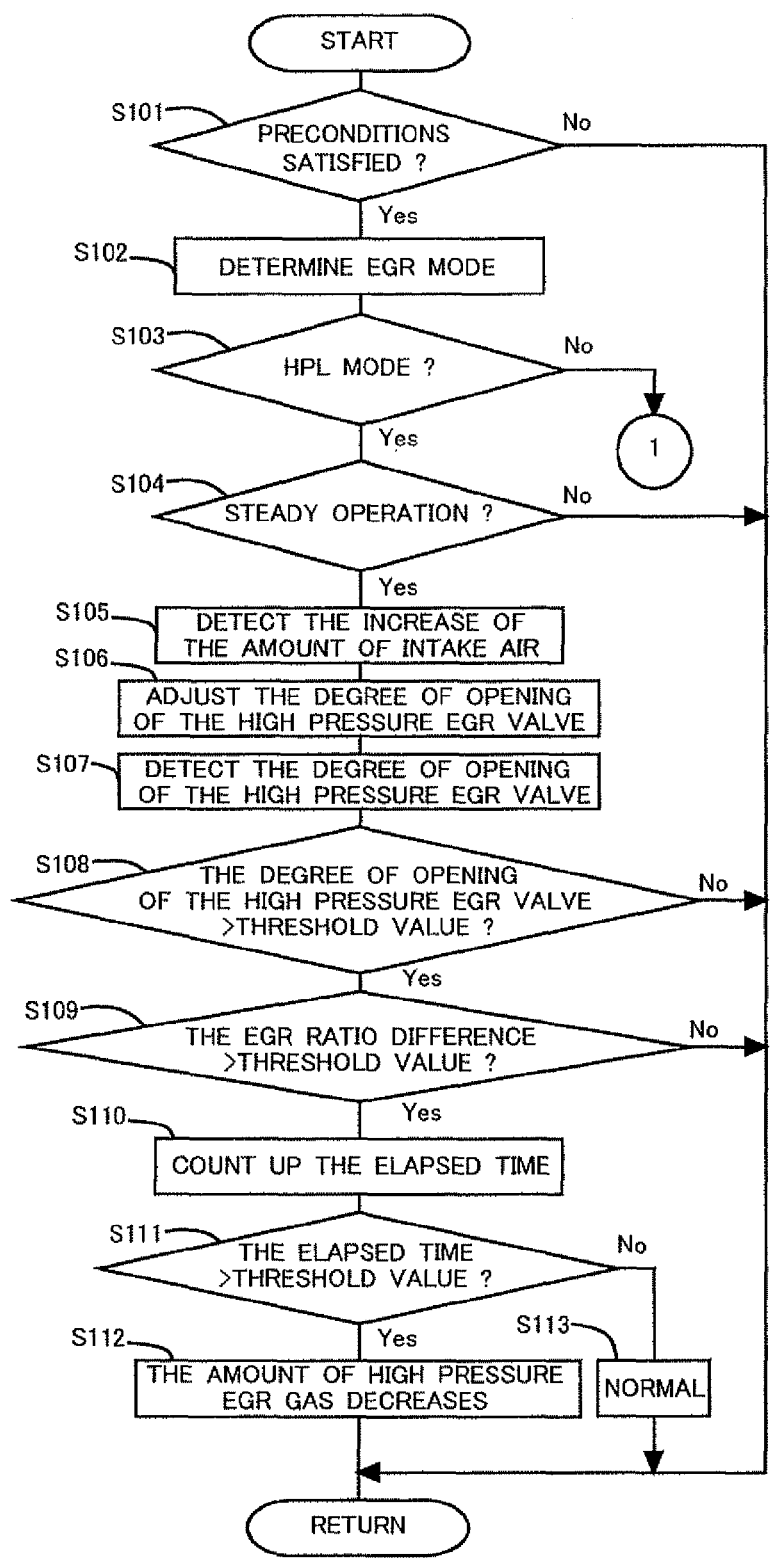

[Fig. 9]
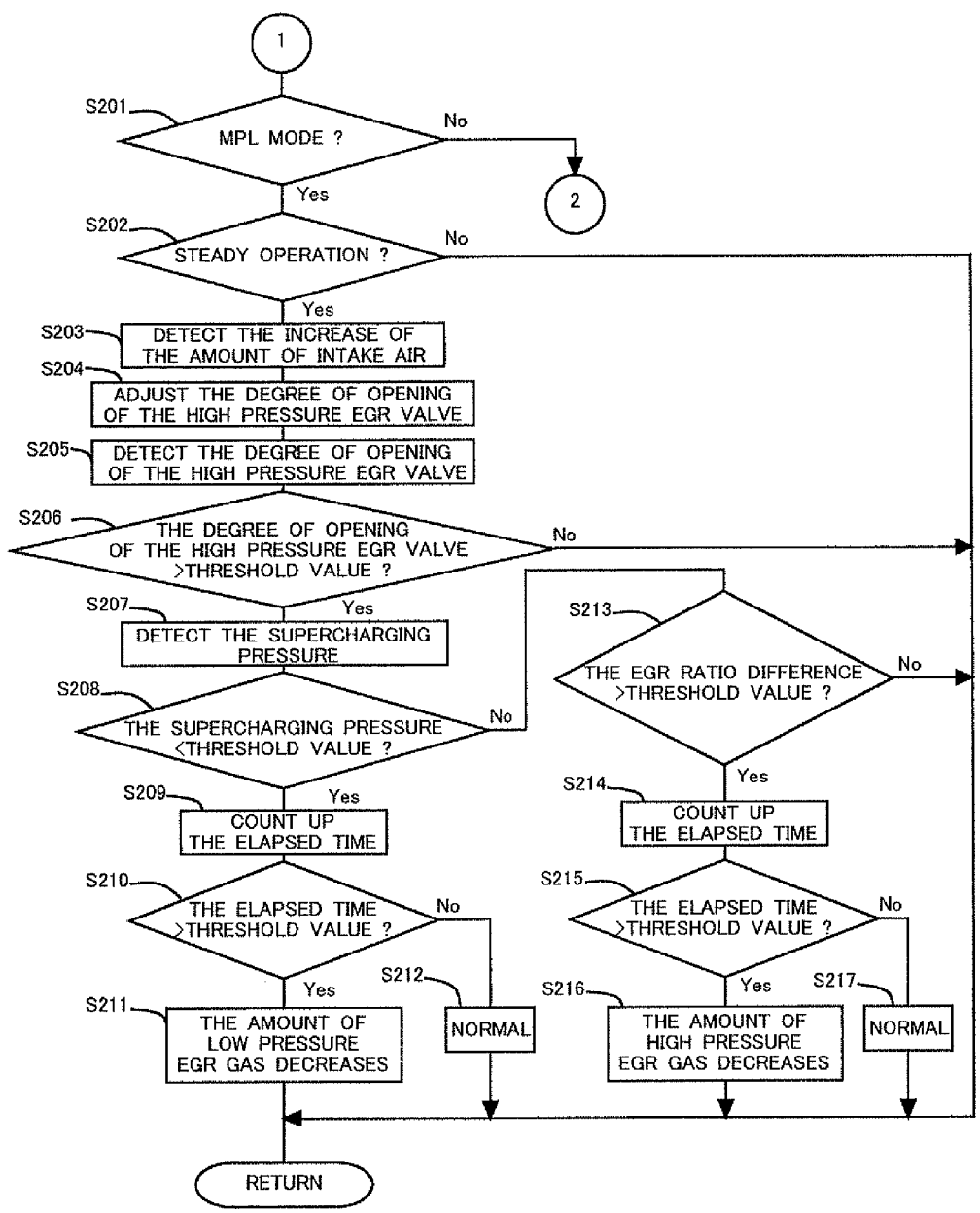

[Fig. 10]
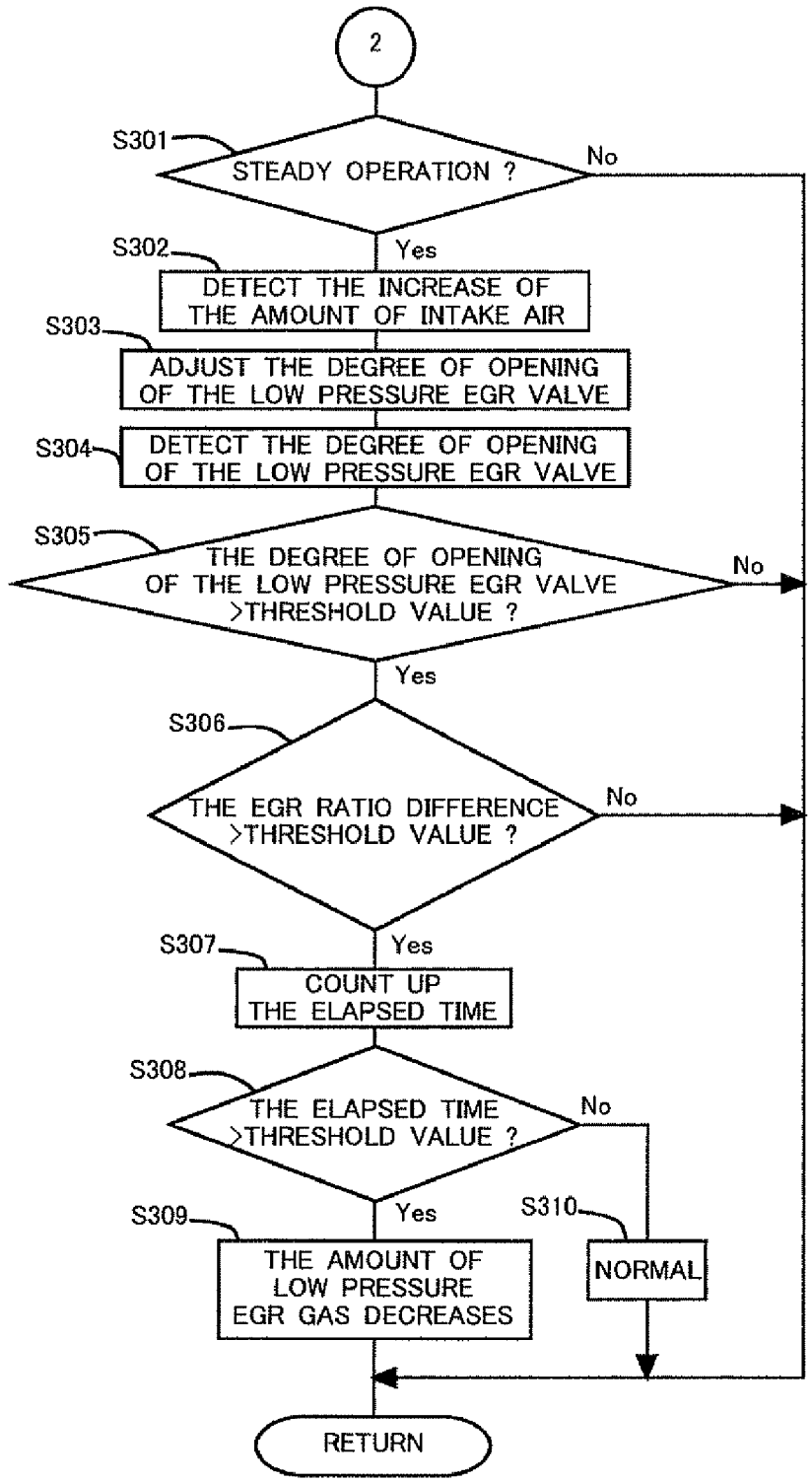

[Fig. 11]
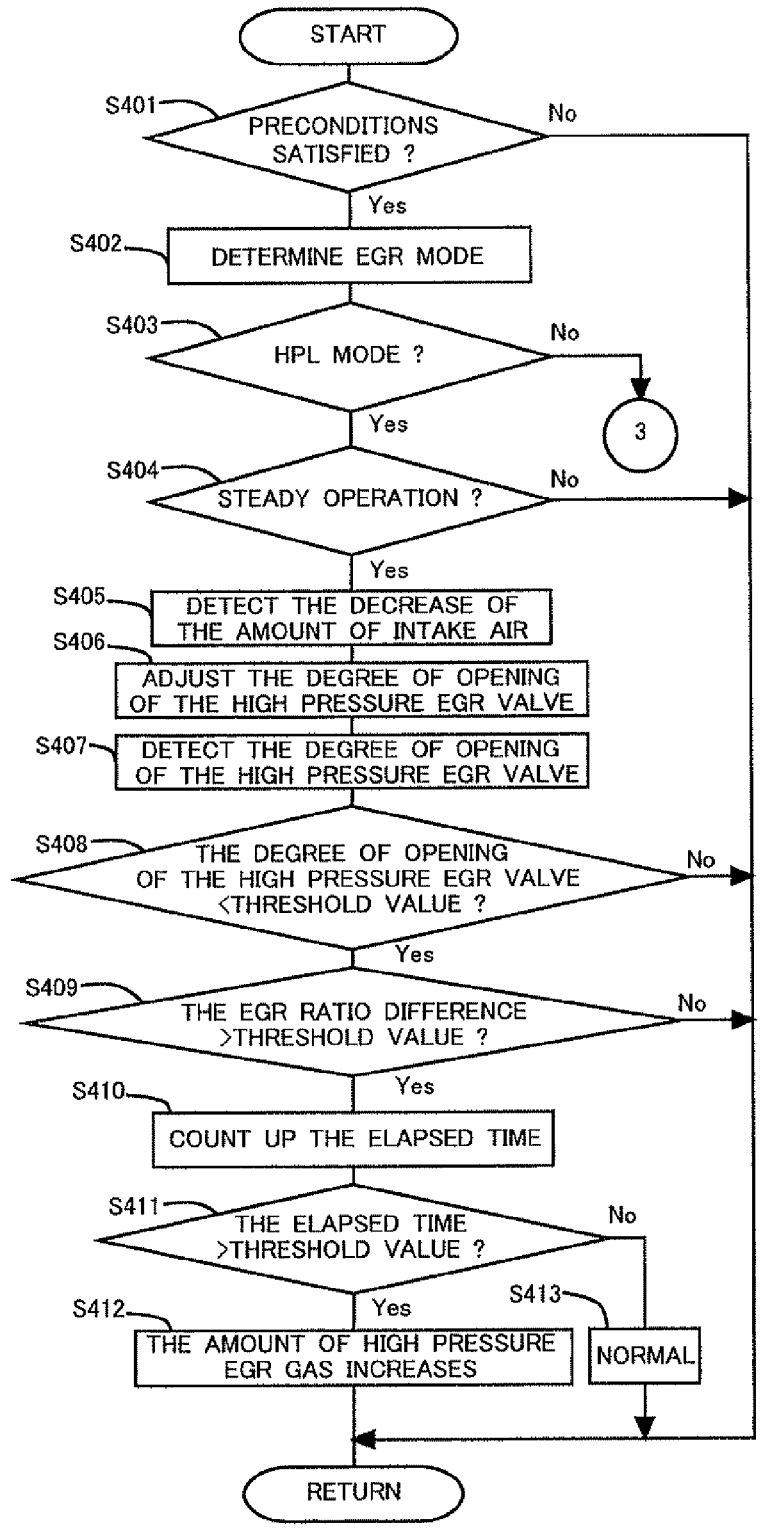

[Fig. 12]
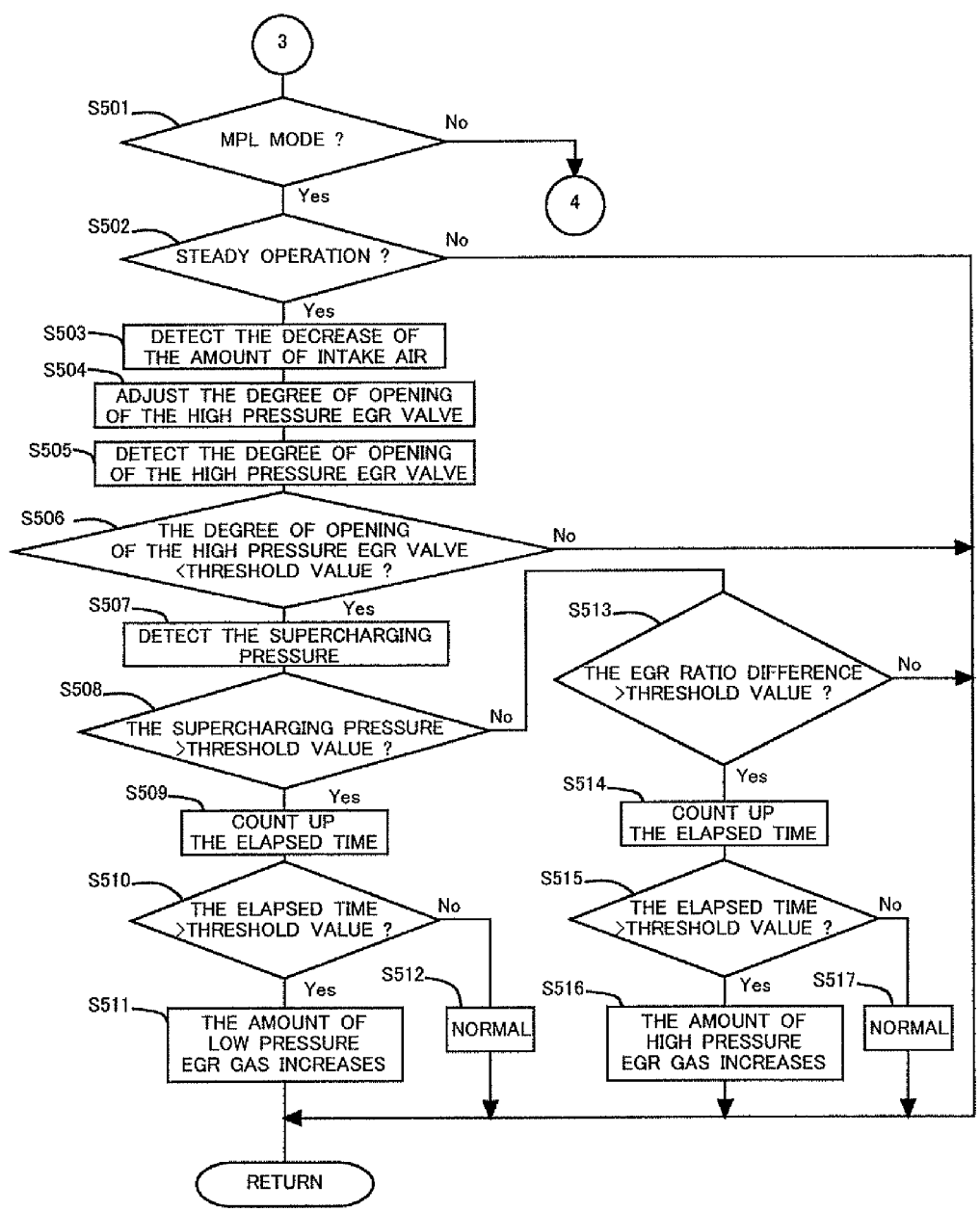

[Fig. 13]
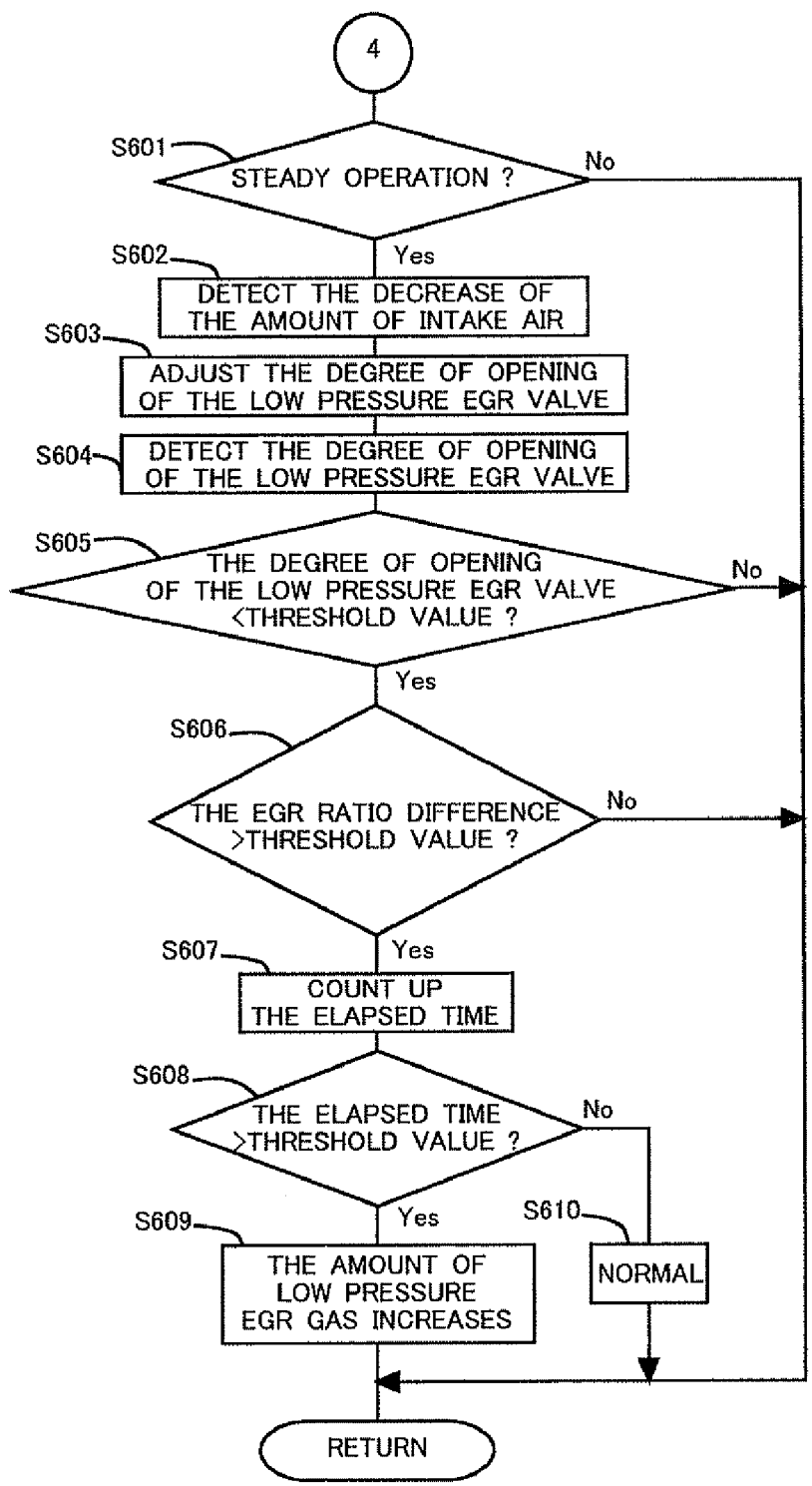

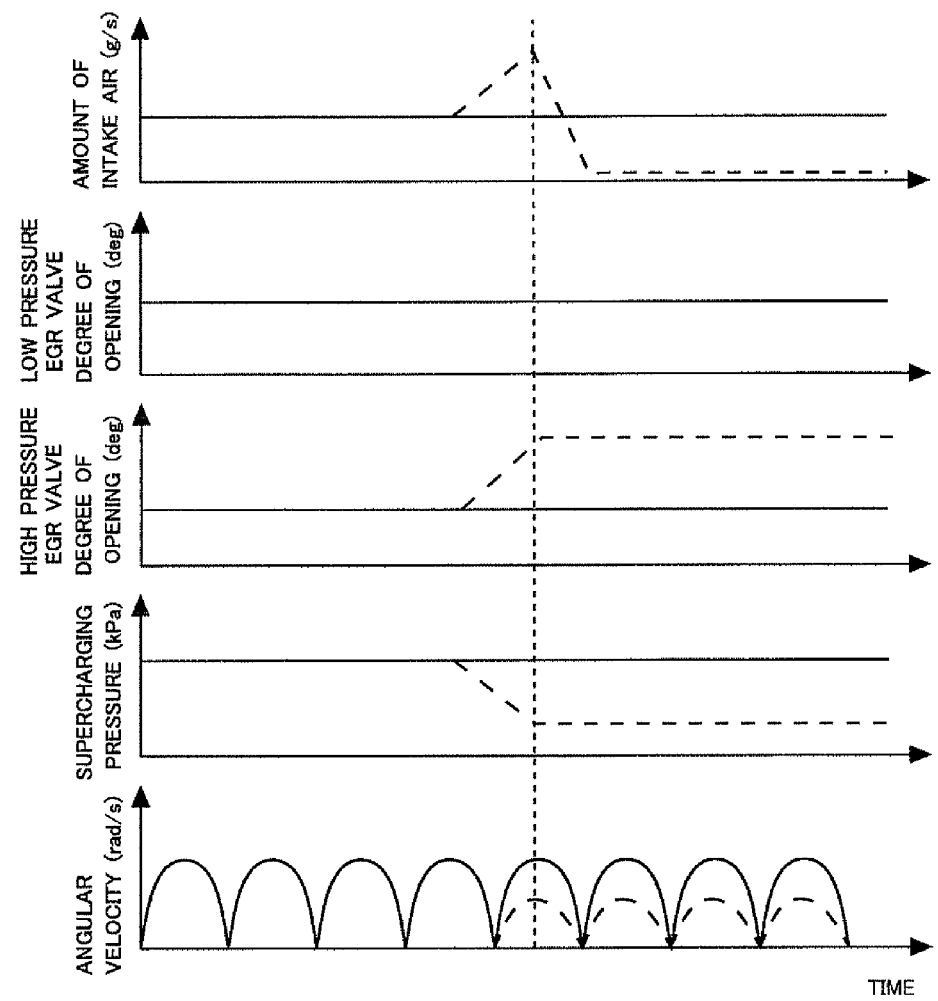
[Fig. 14]

[Fig. 15]
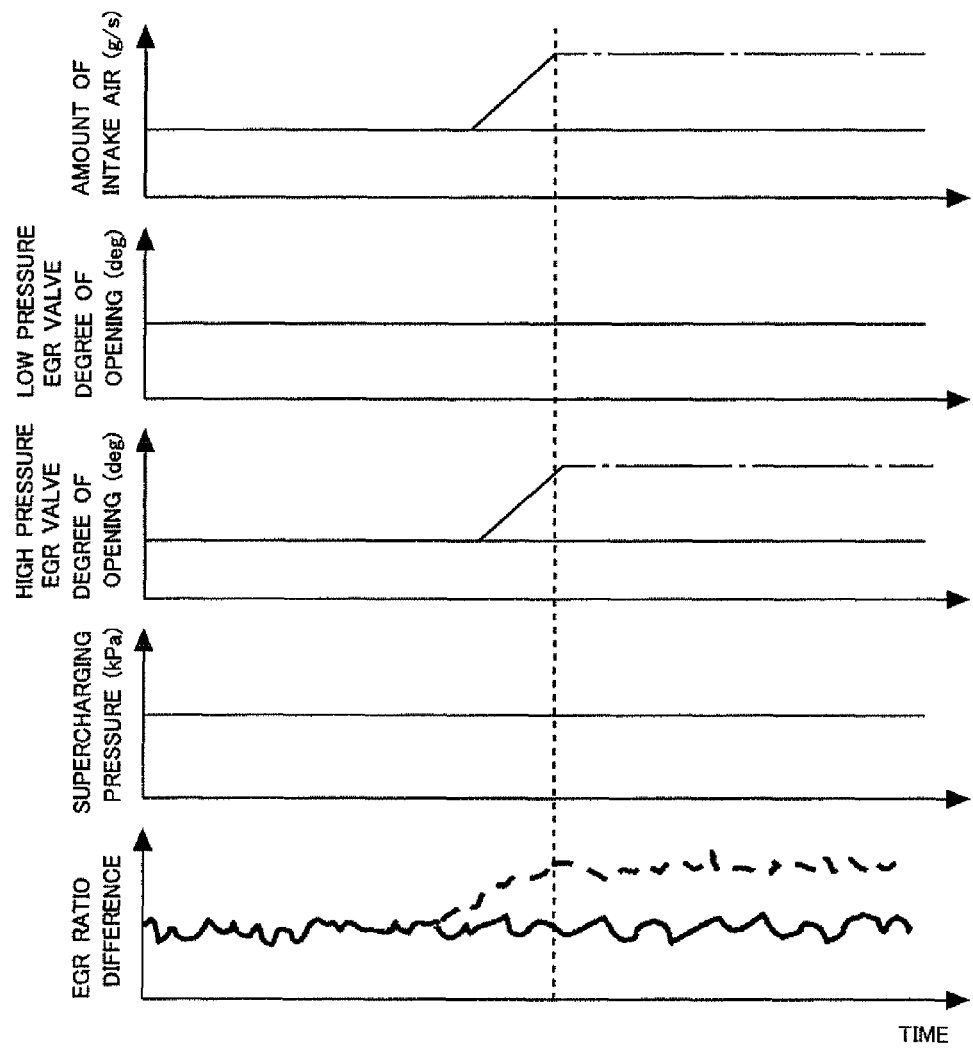

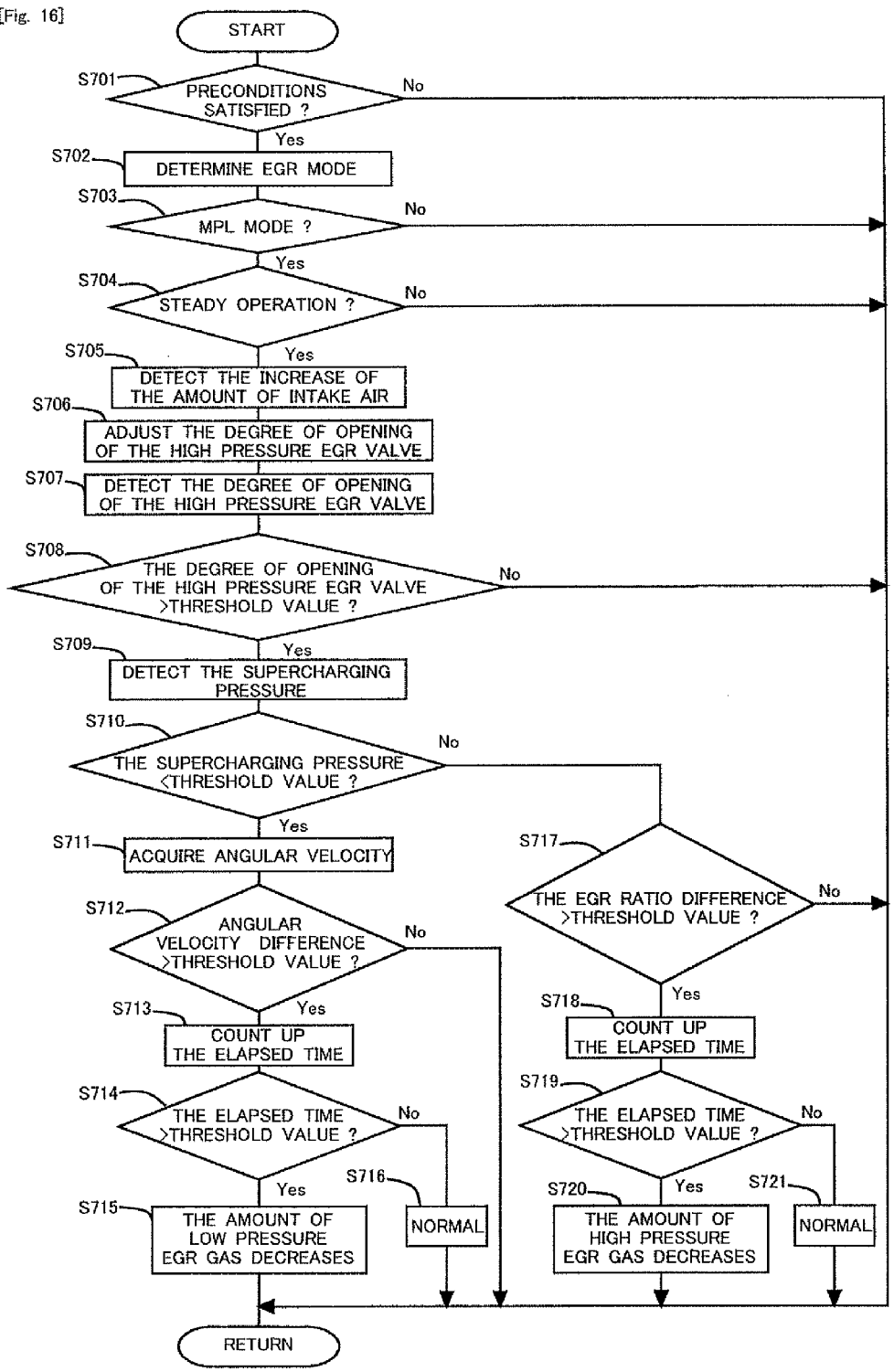

MALFUNCTION DETECTION APPARATUS AND MALFUNCTION DETECTION METHOD FOR AN EGR SYSTEM

TECHNICAL FIELD

The present invention relates to a malfunction detection apparatus and a malfunction detection method for an EGR system.

BACKGROUND ART

There has been known a technique in which in an EGR system equipped with a high pressure EGR device that supplies an EGR gas from a high pressure EGR passage connecting between an exhaust passage at a location upstream of a turbine and an intake passage, and a low pressure EGR device that supplies an EGR gas from a low pressure EGR passage connecting between the exhaust passage at a location downstream of the turbine and the intake passage, the clogging of the low pressure EGR passage is determined by a differential pressure between the exhaust passage and the intake passage (for example, see a first patent document).

With this technique, in order to detect the clogging of the low pressure EGR passage, pressure sensors are arranged in the exhaust passage and the intake passage, respectively. Thus, it is necessary to arrange the sensors separately, so the system becomes high in cost and complicated in construction.

Also, the supply mode of the EGR gas may be changed according to the operating range of an internal combustion engine. For example, at the time of low rotation and low load, the EGR gas is supplied only from the high pressure EGR device, and at the time of high rotation or high load, the EGR gas is supplied only from the low pressure EGR device. In addition, at the time of middle load or the like other than those, the EGR gas may be supplied from both the low pressure EGR device and the high pressure EGR device.

Here, in cases where the amount of EGR gas becomes excessive or short at the time when the EGR gas is supplied from either one of the low pressure EGR device and the high pressure EGR device, it can be determined that one of the devices supplying the EGR gas at that time has a malfunction. However, in cases where the amount of EGR gas becomes excessive or short at the time when the EGR gas is supplied from both the low pressure EGR device and the high pressure EGR device, it is difficult to distinguish whether the low pressure EGR device has a malfunction or the high pressure EGR device has a malfunction. However, internal combustion engines are often operated in a middle load range or in a middle rotational speed range, so only by determining the malfunction of either of the devices at the time when the EGR gas is supplied only from either one of the low pressure EGR device and the high pressure EGR device, it is impossible to get an opportunity to determine the malfunctions of the devices to a satisfactory extent.

PRIOR ART REFERENCES

Patent Documents

First Patent Document: Japanese patent application laid-open No. 2007-292028
Second Patent Document: Japanese patent application laid-open No. 2008-038627
Third Patent Document: Japanese patent application laid-open No. 2008-223554
Fourth Patent Document: Japanese patent application laid-open No. 2008-051022
Fifth Patent Document: Japanese patent application laid-open No. 2008-106706

SUMMARY OF THE INVENTION

Problems to be Solved by the Invention

The present invention has been made in view of the problems as referred to above, and has for its object to provide a technique which is capable of determining, in a simpler manner, the malfunction of a low pressure EGR device that supplies an EGR gas from a low pressure EGR passage connecting between an exhaust passage at a location downstream of a turbine and an intake passage.

Means for Solving the Problems

In order to achieve the above-mentioned object, a malfunction detection apparatus for an EGR system according to the present invention adopts the following units. That is, the malfunction detection apparatus for an EGR system according to the present invention is characterized by comprising:

a turbocharger that has a turbine in an exhaust passage of an internal combustion engine, and has a compressor in an intake passage thereof;

a high pressure EGR device that includes a high pressure EGR passage connecting between the exhaust passage at a location upstream of said turbine and said intake passage, and a high pressure EGR valve for adjusting an amount of EGR gas flowing through said high pressure EGR passage;

a low pressure EGR device that includes a low pressure EGR passage connecting between the exhaust passage at a location downstream of said turbine and said intake passage, and a low pressure EGR valve for adjusting an amount of EGR gas flowing through said low pressure EGR passage; and an opening degree detection device that detects the degree of opening of said high pressure EGR valve;

wherein a detection unit is provided that detects a malfunction of said low pressure EGR device from the degree of opening of said high pressure EGR valve at the time when the EGR gas is supplied from both said high pressure EGR device and said low pressure EGR device, and at the time when said high pressure EGR valve is controlled in a feedback manner so as to direct an amount of EGR gas in a cylinder toward a target range of said amount of EGR gas, while carrying out open loop control of said low pressure EGR valve.

Here, the time when the EGR gas is supplied from both the high pressure EGR device and the low pressure EGR device is when the high pressure EGR valve and the low pressure EGR valve are both opened, and the EGR gas is caused to circulate through the high pressure EGR passage and the low pressure EGR passage, respectively. In addition to this, the EGR gas may be supplied only from the high pressure EGR device, or the EGR gas may be supplied only from the low pressure EGR device.

When the EGR gas is supplied from both the high pressure EGR device and the low pressure EGR device, the high pressure EGR valve and the low pressure EGR valve are opened, respectively, but at this time, the low pressure EGR valve is controlled in an open loop manner and the high pressure EGR valve is controlled in a feedback manner. The low pressure EGR valve is opened to a degree of opening, for example, according to the number of engine revolutions per minute and the engine load. That is, if the operating state of the internal combustion engine is constant, the degree of opening of the low pressure EGR valve will become constant. In addition, the high pressure EGR valve is adjusted in the degree of opening thereof so that the amount of EGR gas becomes a target value. At this time, the degree of opening of the high pressure EGR valve may be adjusted in such a manner that the amount of intake air becomes a target value. Here, what is sucked into the cylinder is the EGR gas and air, so when the amount of EGR gas decreases, the amount of air increases by the decreased amount, and when the amount of EGR gas increases, the amount of air decreases by the increased amount. For this reason, if the amount of air becomes the target value thereof, the amount of EGR gas also becomes the target value thereof. Here, note that the target value of the amount of air or the amount of EGR gas may also be made to have a certain margin as a target range.

Then, for example, in cases where the amount of intake air is less than the target value, the amount of EGR gas is assumed to be excessive, and the high pressure EGR valve is adjusted to a closed side so as to decrease the amount of EGR gas. On the other hand, in cases where the amount of intake air is more than the target value, the amount of EGR gas is assumed to be short or insufficient, and the high pressure EGR valve is adjusted to an open side so as to increase the amount of EGR gas. In this manner, the amount of EGR gas supplied into the cylinder is adjusted by means of the high pressure EGR valve. That is, even if an excess or shortage of the amount of EGR gas in the cylinder is caused due to the low pressure EGR device, the excess or shortage of the amount of EGR gas is eliminated by adjusting the degree of opening of the high pressure EGR valve.

However, when the low pressure EGR device has a malfunction and the extent of the excess or shortage of the amount of EGR gas becomes large, even if the degree of opening of the high pressure EGR valve is adjusted, the amount of EGR gas in the cylinder does not come into a target range of said amount of EGR gas. The degree of opening of the high pressure EGR valve at this time is greatly changed in a direction to eliminate the excess or shortage of the amount of EGR gas. That is, a malfunction of the low pressure EGR device appears in the degree of opening of the high pressure EGR valve. For this reason, the malfunction of the low pressure EGR device can be determined based on the degree of opening of the high pressure EGR valve. Here, note that because a malfunction of the high pressure EGR device can be detected, for example, when an EGR gas is supplied only from the high pressure EGR device, the malfunction of the low pressure EGR device may be detected under the premise that there is no malfunction in said high pressure EGR device.

Then, said detection unit can make a determination that there is a malfunction in said low pressure EGR device, when the degree of opening of said high pressure EGR valve is out of a specified range.

Here, if there is no malfunction in the low pressure EGR device, the amount of EGR gas can be adjusted to the target value thereof without changing the degree of opening of the high pressure EGR valve to a large extent, so the degree of opening of the high pressure EGR valve becomes in the specified range. That is, if the degree of opening of the high pressure EGR valve is controlled in a feedback manner within the specified range, the amount of EGR gas is in the target range, and the low pressure EGR device is normal. On the other hand, in cases where the degree of opening of the high pressure EGR valve becomes larger than the specified range or becomes smaller than the target range thereof, it can be determined that the low pressure EGR device has a malfunction. Here, note that the specified range is a range of the degree of opening of the high pressure EGR valve in the case where there is no malfunction in the low pressure EGR device.

In addition, in the present invention, provision is made for:

an intake air amount detection unit that detects an amount of intake air in said internal combustion engine; and an estimation unit that estimates an EGR ratio which is a ratio or proportion of an EGR gas in a gas sucked into the cylinder of said internal combustion engine;

wherein said detection unit can determine that said low pressure EGR device has a malfunction, when the degree of opening of said high pressure EGR valve is out of the specified range, and when the amount of intake air detected by said intake air amount detection unit is within a reference range of the amount of intake air, and further when the EGR ratio estimated by said estimation unit is out of a target range of said EGR ratio.

When there is a malfunction in the low pressure EGR device, changes occur besides the degree of opening of the high pressure EGR valve. If these changes are also used together for the detection of malfunction of the low pressure EGR device, it is possible to make the accuracy of detection higher. The reference range in the amount of intake air can be a range in which the combustion condition of the internal combustion engine becomes good, i.e., a range in which the combustion condition of the internal combustion engine does not get worse, or a range in which misfiring does not occur. It may also be a range of the amount of intake air required for the internal combustion engine to operate. For example, in cases where particulate matter or the like gets clogged in the low pressure EGR passage, the EGR gas becomes short, so that the amount of intake air increases. At this time, the degree of opening of the high pressure EGR valve is made larger, but as a result, the amount of gas passing through the turbine is decreased, so the supercharging pressure falls. Then, when the supercharging pressure becomes too low, there will now be a possibility that the amount of intake air may be insufficient, thus giving rise to a misfire. In view of this, the reference range is set as a range of the amount of intake air in which misfiring is not generated due to the shortage of the amount of intake air. In addition, the target range of the EGR ratio means a range of the EGR ratio at the time when the low pressure EGR device is normal. That is, it means that when the EGR ratio is out of the target range of said EGR ratio, the EGR ratio does not fall in the target range by the adjustment of the degree of opening of the high pressure EGR valve. Thus, the malfunction of the low pressure EGR device appears as a plurality of phenomena.

Then, when the amount of intake air is in the reference range, the combustion condition in the internal combustion engine is good, so a certain amount of intake air is detected by the intake air amount detection unit. When the amount of intake air becomes less than the reference range, the combustion condition of the internal combustion engine gets worse, so there will be a possibility that the relation between the change of the degree of opening of the high pressure EGR valve and the malfunction of the low pressure EGR device may not hold. That is, by determining the malfunction of the low pressure EGR device when the amount of intake air is in the reference range, it becomes possible to perform malfunction detection with high precision.

In addition, when the EGR ratio is out of the target range thereof, it can be said to be a state in which the amount of EGR gas can not be adjusted to a sufficient extent only by changing the degree of opening of the high pressure EGR valve. That is, it means that even if the low pressure EGR valve is controlled in an open loop manner and the high pressure EGR valve is controlled in a feedback manner, the EGR ratio can not be made into the target range thereof. This means that the low pressure EGR device has a malfunction. In this manner, by detecting a malfunction of the low pressure EGR device while also adding the amount of intake air and the EGR ratio besides the degree of opening of the high pressure EGR valve, it is possible to more enhance the accuracy of the detection of a malfunction.

Moreover, said detection unit can determine the presence of a malfunction in which the amount of EGR gas flowing through said low pressure EGR passage becomes less than the target range of said amount of EGR gas, when the degree of opening of said high pressure EGR valve is larger than said specified range, and when the amount of intake air detected by said intake air amount detection unit is within the reference range of said amount of intake air, and further when the EGR ratio estimated by said estimation unit is lower than the target range of said EGR ratio.

When the amount of EGR gas in the cylinder becomes less than the target range thereof, the degree of opening of the high pressure EGR valve is made larger. When the amount of EGR gas can not be made into the target range thereof even if the degree of opening of the high pressure EGR valve is made larger, the degree of opening of the high pressure EGR valve comes to be adjusted beyond the specified range. That is, the degree of opening of the high pressure EGR valve becomes larger than the specified range. In addition, when the amount of EGR gas in the cylinder becomes less than the target range thereof, the EGR ratio becomes lower than the target range of said EGR ratio due to the shortage of the amount of EGR gas.

That is, as the amount of EGR gas decreases, the high pressure EGR valve is adjusted to its open side so that the amount of EGR gas supplied from the high pressure EGR device is increased, but it is considered that the amount of EGR gas supplied from the low pressure EGR device is so small that the amount of EGR gas is still short even with this. Then, if such a thing happens, it can be determined that in the low pressure EGR device, there occurs a malfunction in which the flow rate of EGR gas falls. Here, note that the malfunction in which the flow rate of EGR gas falls includes, for example, the clogging of the low pressure EGR passage, or the degree of opening of the low pressure EGR valve being adjusted to a more closed side than a target degree of opening, or the low pressure EGR valve being kept closed and unable to be opened.

Further, said detection unit can determine the presence of a malfunction in which the amount of EGR gas flowing through said low pressure EGR passage becomes more than the target range of said amount of EGR gas, when the degree of opening of said high pressure EGR valve is smaller than said specified range, and when the amount of intake air detected by said intake air amount detection unit is within the reference range of said amount of intake air, and further when the EGR ratio estimated by said estimation unit is higher than the target range of said EGR ratio.

When the amount of EGR gas in the cylinder becomes more than the target range thereof, the degree of opening of the high pressure EGR valve is made smaller. When the amount of EGR gas can not be made into the target range thereof even if the degree of opening of the high pressure EGR valve is made smaller, the degree of opening of the high pressure EGR valve comes to be adjusted beyond the specified range. That is, the degree of opening of the high pressure EGR valve becomes smaller than the specified range. In addition, when the amount of EGR gas in the cylinder becomes more than the target range thereof, the amount of EGR gas becomes excessive, so the EGR ratio becomes higher than the target range of said EGR ratio.

That is, as the EGR ratio rises, the high pressure EGR valve is adjusted to its closed side so that the amount of EGR gas supplied from the high pressure EGR device is decreased, but it is considered that the amount of EGR gas supplied from the low pressure EGR device is so large that the amount of EGR gas still becomes excessive even with this. Then, if such a thing happens, it can be determined that in the low pressure EGR device, there occurs a malfunction in which the flow rate of EGR gas becomes excessive. Here, note that the malfunction in which the flow rate of EGR gas becomes excessive includes, for example, breakage of the low pressure EGR valve.

On the other hand, in the present invention, provision is made for a correlation value acquisition unit that acquires a value correlated with an amount of gas passing through said turbine, wherein said detection unit can determine that there is a malfunction in said low pressure EGR device, when the degree of opening of said high pressure EGR valve is out of the specified range, and when the value acquired by said correlation value acquisition unit indicates that the amount of gas passing through said turbine is out of the reference range of said amount of gas.

The value correlated with the amount of gas passing through the turbine may be the amount of gas passing through the turbine itself, or may also be the supercharging pressure. Further, it may also be the temperature of the exhaust gas. That is, as the amount of gas passing through the turbine decreases, the supercharging pressure also decreases, and the temperature of the exhaust gas falls, so these can be called values correlated with the amount of gas passing through the turbine. In addition, the value correlated with the amount of gas passing through the turbine may also be a ratio of the amount of gas passing through the turbine with respect to the amount of EGR gas flowing through the high pressure EGR passage. That is, the higher the proportion of the amount of EGR gas flowing through the high pressure EGR passage, the smaller the amount of gas passing through the turbine becomes, so this can also be called a value correlated with the amount of gas passing through the turbine. Moreover, the reference range of the amount of gas passing through the turbine means a range of the amount of gas that passes through the turbine when there is no malfunction in the EGR system. Here, note that the determination of a malfunction may be made by using a value correlated with the amount of gas passing through the turbine as it is, or the determination of a malfunction may be made by using a value correlated with the amount of gas passing through the turbine which is converted into a corresponding amount of gas passing through the turbine. For example, when the supercharging pressure is out of a reference range of said supercharging pressure, it may be assumed that the amount of gas passing through the turbine is out of the reference range of said amount of gas. Further, when the temperature of the exhaust gas is out of a reference range of said temperature of the exhaust gas, it may be assumed that the amount of gas passing through the turbine is out of the reference range of said amount of gas.

Here, when the exhaust gas flowing through the exhaust passage is taken into the high pressure EGR passage, the amount of gas flowing through the exhaust passage downstream thereof is accordingly decreased by the amount thereof taken into the high pressure EGR passage. That is, the amount of gas passing through the turbine of the turbocharger decreases. As a result, the number of revolutions per minute of the turbine becomes lower, and hence the supercharging pressure also falls. That is, the supercharging pressure falls in accordance with the increasing amount of EGR gas flowing through the high pressure EGR passage. This can be said that the supercharging pressure changes according to the ratio of the amount of EGR gas taken into the high pressure EGR passage with respect to the amount of the exhaust gas flowing through the exhaust passage downstream thereof.

Then, when the value acquired by the correlation value acquisition unit indicates that the amount of gas passing through the turbine is out of the reference range of said amount of gas, it can be said to be in a state in which the amount of EGR gas can not be adjusted in a sufficient extent only by changing the degree of opening of the high pressure EGR valve. That is, even if the low pressure EGR valve is controlled in an open loop manner and the high pressure EGR valve is controlled in a feedback manner, the amount of the gas passing through the turbine can not be made into the target range thereof. This means that the low pressure EGR device has a malfunction. In this manner, by detecting a malfunction of the low pressure EGR device while also adding a value correlated with the amount of the gas passing through the turbine, besides the degree of opening of the high pressure EGR valve, it is possible to more enhance the accuracy of the detection of a malfunction.

In addition, said detection unit can determine the presence of a malfunction in which the amount of EGR gas flowing through said low pressure EGR passage becomes less than the target range of said amount of EGR gas, when the degree of opening of said high pressure EGR valve is larger than said specified range, and when the value acquired by said correlation value acquisition unit indicates that the amount of gas passing through said turbine is smaller than the reference range of said amount of gas.

When the amount of EGR gas in the cylinder becomes less than the target range thereof, the degree of opening of the high pressure EGR valve is made larger. When the amount of EGR gas can not be made into the target range thereof even if the degree of opening of the high pressure EGR valve is made larger, the degree of opening of the high pressure EGR valve comes to be adjusted beyond the specified range. That is, the degree of opening of the high pressure EGR valve becomes larger than the specified range. In addition, due to the increased degree of opening of the high pressure EGR valve, the amount of EGR gas flowing through the high pressure EGR passage increases, so the amount of gas passing through the turbine accordingly decreases by the increased amount of EGR gas.

That is, as the amount of EGR gas decreases, the high pressure EGR valve is adjusted to its open side so that the amount of EGR gas supplied from the high pressure EGR device is increased, but it is considered that the amount of EGR gas supplied from the low pressure EGR device is so small that the amount of EGR gas is still short even with this. In addition, the high pressure EGR valve is adjusted to its open side, and the amount of EGR gas flowing through the high pressure EGR passage is increased, so the amount of gas passing through the turbine accordingly decreases by the increased amount of EGR gas. Then, in cases where the amount of EGR gas supplied from the low pressure EGR device is so small that the amount of EGR gas is still short even if the high pressure EGR valve is adjusted to its open side, the amount of gas passing through the turbine becomes smaller than the reference range thereof. If such a thing happens, it can be determined that in the low pressure EGR device, there occurs a malfunction in which the flow rate of EGR gas falls.

Moreover, said detection unit can determine the presence of a malfunction in which the amount of EGR gas flowing through said low pressure EGR passage becomes more than the target range of said amount of EGR gas, when the degree of opening of said high pressure EGR valve is smaller than said specified range, and when the value acquired by said correlation value acquisition unit indicates that the amount of gas larger than the reference range of said amount of gas.

When the amount of EGR gas in the cylinder becomes more than the target range thereof, the degree of opening of the high pressure EGR valve is made smaller. When the amount of EGR gas can not be made into the target range thereof even if the degree of opening of the high pressure EGR valve is made smaller, the degree of opening of the high pressure EGR valve comes to be adjusted beyond the specified range. That is, the degree of opening of the high pressure EGR valve becomes smaller than the specified range. In addition, due to the decreased degree of opening of the high pressure EGR valve, the amount of EGR gas flowing through the high pressure EGR passage decreases, so the amount of gas passing through the turbine accordingly increases by the decreased amount of EGR gas.

That is, as the amount of EGR gas increases, the high pressure EGR valve is adjusted to its closed side so that the amount of EGR gas supplied from the high pressure EGR device is decreased, but it is considered that the amount of EGR gas supplied from the low pressure EGR device is so large that the amount of EGR gas still becomes excessive even with this. In addition, the high pressure EGR valve is adjusted to its closed side, and the amount of EGR gas flowing through the high pressure EGR passage is decreased, so the amount of gas passing through the turbine accordingly increases by the decreased amount of EGR gas. Then, in cases where the amount of EGR gas supplied from the low pressure EGR device is so large that the amount of EGR gas still becomes excessive even if the high pressure EGR valve is adjusted to its closed side, the amount of gas passing through the turbine becomes larger than the reference range thereof. If such a thing happens, it can be determined that in the low pressure EGR device, there occurs a malfunction in which the flow rate of EGR gas becomes excessive.

Further, provision is made for an estimation unit that estimates an EGR ratio which is a ratio of an EGR gas in a gas sucked into the cylinder of said internal combustion engine, wherein said detection unit can determine the presence of a malfunction in which the amount of EGR gas flowing through said high pressure EGR passage becomes less than the target range of said amount of EGR gas, when the degree of opening of said high pressure EGR valve is larger than said specified range, and when the value acquired by said correlation value acquisition unit indicates that the amount of gas passing through said turbine is within the reference range of said amount of gas, and further when the EGR ratio estimated by said estimation unit is lower than the target range of said EGR ratio.

In cases where the excess or shortage of the amount of EGR gas occurs during the time when the EGR gas is supplied from both the high pressure EGR device and the low pressure EGR device, it may become necessary to make a determination as to which of the devices has a malfunction. Here, the case where the high pressure EGR device has a malfunction, and the case where the low pressure EGR device has a malfunction, are different from each other in their relations between the degree of opening of the high pressure EGR valve and the value acquired by the correlation value acquisition unit, respectively.

Here, when the amount of EGR gas decreases, the high pressure EGR valve is adjusted to its open side so as to increase the amount of EGR gas supplied from the high pressure EGR device. However, in cases where the amount of EGR gas is still short even with this, it is considered that the amount of EGR gas supplied from the high pressure EGR device or the low pressure EGR device is insufficient. In cases where the amount of EGR gas is short due to the malfunction of the low pressure EGR device, as mentioned above, the amount of gas passing through the turbine is made less than the reference range thereof by opening the high pressure EGR valve.

On the other hand, in cases where the amount of EGR gas is short or insufficient due to the presence of a malfunction of the high pressure EGR device, the amount of EGR gas flowing through the high pressure EGR passage is not increased even if the high pressure EGR valve is adjusted to its open side. For example, in cases where the high pressure EGR passage is clogged up, the EGR gas does not flow irrespective of the degree of opening of the high pressure EGR valve. As a result, even if the high pressure EGR valve is adjusted to its open side, the amount of gas passing through the turbine does not substantially change. That is, the amount of gas passing through the turbine does not change while remaining in the reference range thereof. In addition, because the amount of EGR gas supplied from the high pressure EGR passage is insufficient, the EGR ratio becomes lower than the target range thereof. If such a thing happens, it can be determined that in the high pressure EGR device, there is a malfunction in which the amount of EGR gas flowing through the high pressure EGR passage becomes less than the target range of said amount of EGR gas. Moreover, it is also possible to distinguish which of the high pressure EGR device and the low pressure EGR device has a malfunction.

In addition, provision is made for an estimation unit that estimates an EGR ratio which is a ratio of an EGR gas in a gas sucked into the cylinder of said internal combustion engine, wherein said detection unit can determine the presence of a malfunction in which the amount of EGR gas flowing through said high pressure EGR passage becomes more than the target range of said amount of EGR gas, when the degree of opening of said high pressure EGR valve is smaller than said specified range, and when the value acquired by said correlation value acquisition unit indicates that the amount of gas passing through said turbine is smaller than the reference range of said amount of gas, and further when the EGR ratio estimated by said estimation unit is higher than the target range of said EGR ratio.

Here, when the amount of EGR gas increases, the high pressure EGR valve is adjusted to its closed side so as to decrease the amount of EGR gas supplied from the high pressure EGR device. However, in cases where the amount of EGR gas is still excessive even with this, it is considered that the amount of EGR gas supplied from the high pressure EGR device or the low pressure EGR device is excessive. In cases where the amount of EGR gas is excessive due to the malfunction of the low pressure EGR device, as mentioned above, the amount of gas passing through the turbine is made more than the reference range thereof by closing the high pressure EGR valve.

On the other hand, in cases where the amount of EGR gas is excessive due to the presence of a malfunction of the high pressure EGR device, the amount of EGR gas flowing through the high pressure EGR passage remains excessive even if the high pressure EGR valve is adjusted to its closed side. For example, in cases where the high pressure EGR valve is broken, even if the degree of opening of the high pressure EGR valve is adjusted to its closed side, the passage sectional area of the high pressure EGR passage changes little, so the amount of EGR gas does not substantially change. In addition, the amount of the gas passing through the turbine decreases by an amount by which the amount of the EGR gas flowing through the high pressure EGR passage increases. That is, the amount of gas passing through the turbine becomes smaller than the reference range thereof. Further, because the amount of EGR gas supplied from the high pressure EGR passage is excessive, the EGR ratio becomes higher than the target range thereof. If such a thing happens, it can be determined that in the high pressure EGR device, there is a malfunction in which the amount of EGR gas flowing through the high pressure EGR passage becomes more than the target range of said amount of EGR gas. Furthermore, it is also possible to distinguish which of the high pressure EGR device and the low pressure EGR device has a malfunction.

Moreover, in order to achieve the above-mentioned object, a malfunction detection method for an EGR system according to the present invention adopts the following steps. That is, the malfunction detection method for an EGR system according to the present invention is characterized by comprising:

a first step of carrying out feedback control of a high pressure EGR valve so as to direct an amount of EGR gas in a cylinder toward a target range of said amount of EGR gas, while carrying out open loop control of a low pressure EGR valve, at the time when EGR gas is supplied from both of a high pressure EGR device and a low pressure EGR device, said high pressure EGR device including a high pressure EGR passage connecting between an exhaust passage at a location upstream of a turbine of said internal combustion engine and an intake passage, and said high pressure EGR valve for adjusting an amount of EGR gas flowing through said high pressure EGR passage, said low pressure EGR device including a low pressure EGR passage connecting between said exhaust passage at a location downstream of said turbine and said intake passage, and said low pressure EGR valve for adjusting an amount of EGR gas flowing through said low pressure EGR passage; and a second step of detecting a malfunction of said low pressure EGR device from the degree of opening of said high pressure EGR valve at the time when said first step is carried out.

Here, note that in said second step, a determination can be made that there is a malfunction in said low pressure EGR device, when the degree of opening of said high pressure EGR valve is out of a specified range.

In addition, in said second step, a determination can be made that there is a malfunction in said low pressure EGR device, when the degree of opening of said high pressure EGR valve is out of said specified range, and when an amount of intake air in an internal combustion engine is within a reference range of said amount of intake air, and further when an EGR ratio which is a ratio of an EGR gas in a gas sucked into a cylinder of said internal combustion engine is out of a target range of said EGR ratio.

Moreover, in said second step, a determination can be made that there is a malfunction in said low pressure EGR device, when the degree of opening of said high pressure EGR valve is out of said specified range, and when a value correlated with an amount of gas passing through said turbine is out of a reference range of said value.

Effect of the Invention

According to the present invention, a determination can be made more simply as to a malfunction of a low pressure EGR device that supplies an EGR gas from a low pressure EGR passage connecting between an exhaust passage at a location downstream of a turbine and an intake passage.

BRIEF DESCRIPTION OF THE DRAWINGS

FIG. 1 is a view showing the schematic construction of an internal combustion engine and its intake and exhaust systems according to an embodiment of the present invention.

FIG. 2 is a view showing the relation between the number of engine revolutions, the engine load, and the control modes of EGR feedback control.

FIG. 3 is a view showing a control method in each control mode.

FIG. 4 is a time chart showing the changes over time of the amount of intake air, the degree of opening of a low pressure EGR valve, the degree of opening of a high pressure EGR valve, and supercharging pressure, at the time when the amount of low pressure EGR gas flowing through a low pressure EGR passage decreases to a value less than that at the time of normal operation.

FIG. 5 is a time chart showing the changes over time of the amount of intake air, the degree of opening of the low pressure EGR valve, the degree of opening of the high pressure EGR valve, supercharging pressure, and an EGR ratio difference, at the time when the amount of high pressure EGR gas flowing through a high pressure EGR passage decreases to a value less than that at the time of normal operation.

FIG. 6 is a time chart showing the changes over time of the amount of intake air, the degree of opening of the low pressure EGR valve, the degree of opening of the high pressure EGR valve, and supercharging pressure, at the time when the amount of low pressure EGR gas flowing through the low pressure EGR passage increases to a value more than that at the time of normal operation.

FIG. 7 is a time chart showing the changes over time of the amount of intake air, the degree of opening of the low pressure EGR valve, the degree of opening of the high pressure EGR valve, supercharging pressure, and the EGR ratio difference, at the time when the amount of high pressure EGR gas flowing through the high pressure EGR passage increases to a value more than that at the time of normal operation.

FIG. 8 is a flow chart showing the flow of determining a malfunction of an EGR system according to a first embodiment.

FIG. 9 is a flow chart showing the flow of determining a malfunction of the EGR system according to the first embodiment.

FIG. 10 is a flow chart showing the flow of determining a malfunction of the EGR system according to the first embodiment.

FIG. 11 is a flow chart showing the flow of determining a malfunction of the EGR system according to the first embodiment.

FIG. 12 is a flow chart showing the flow of determining a malfunction of the EGR system according to the first embodiment.

FIG. 13 is a flow chart showing the flow of determining a malfunction of the EGR system according to the first embodiment.

FIG. 14 is a time chart showing the changes over time of the amount of intake air, the degree of opening of the low pressure EGR valve, the degree of opening of the high pressure EGR valve, supercharging pressure, and the rotational angular velocity of a crankshaft at the time when the amount of low pressure EGR gas flowing through the low pressure EGR passage decreases to a value less than that at the time of normal operation.

FIG. 15 is a time chart showing the changes over time of the amount of intake air, the degree of opening of the low pressure EGR valve, the degree of opening of the high pressure EGR valve, supercharging pressure, and the EGR ratio difference, at the time when the amount of high pressure EGR gas flowing through the high pressure EGR passage decreases to a value less than that at the time of normal operation.

FIG. 16 is a flow chart showing the flow of determining a malfunction of an EGR system according to a second embodiment.

BEST MODES FOR CARRYING OUT THE INVENTION

Hereinafter, reference will be made to specific embodiments of a malfunction detection apparatus and a malfunction detection method for an EGR system according to the present invention based on the attached drawings.

First Embodiment

FIG. 1 is a view showing the schematic construction of an internal combustion engine and its intake and exhaust systems according to this embodiment of the present invention. The internal combustion engine 1 shown in FIG. 1 is a four-cycle diesel engine of a water cooled type having four cylinders 2. Here, note that in this embodiment, a diesel engine will be mentioned and explained as an example, but the present invention can be similarly applied even to other engines such as for example a gasoline engine.

An intake passage 3 and an exhaust passage 4 are connected to the internal combustion engine 1. In the middle of this intake passage 3, there is arranged a compressor 5a of a turbocharger 5 that is driven to operate with the use of the energy of an exhaust gas as a driving source. In addition, in the intake passage 3 at a location upstream of the compressor 5a, there is arranged a first intake throttle valve 6 that serves to adjust the flow rate of intake air flowing through the intake passage 3. This first intake throttle valve 6 is driven to open and close by an electric actuator. In the intake passage 3 at a location upstream of the first intake throttle valve 6, there is arranged an air flow meter 7 that outputs a signal corresponding to the flow rate of air flowing through the intake passage 3. By means of this air flow meter 7, the amount of intake air sucked into the internal combustion engine 1 is metered or measured. Here, note that in this embodiment, the air flow meter 7 corresponds to an intake air amount detection unit in the present invention.

An intercooler 8 for performing heat exchange between intake air and outside air is arranged in the intake passage 3 at a location downstream of the compressor 5a. Then, in the intake passage 3 at a location downstream of the intercooler 8, there is arranged a second intake throttle valve 9 that serves to adjust the flow rate of intake air flowing through the intake passage 3. This second intake throttle valve 9 is driven to open and close by an electric actuator. In addition, in the intake passage 3 at a location downstream of the second intake throttle valve 9, there is arranged a pressure sensor 12 that serves to detect the pressure of intake air flowing through the intake passage 3. By this pressure sensor 12, supercharging pressure can be acquired. Here, note that in this embodiment, the pressure sensor 12 corresponds to a correlation value acquisition unit in the present invention.

On the other hand, a turbine 5b of the above-mentioned turbocharger 5 is arranged in the middle of the exhaust passage 4. In addition, a particulate filter (hereinafter referred to simply as a filter) 10 is arranged in the exhaust passage 4 downstream of the turbine 5b. In this filter 10, a catalyst may be supported, for example.

In addition, the internal combustion engine 1 is equipped with a low pressure EGR device 30 that recirculates a part of the exhaust gas flowing through the exhaust passage 4 to the intake passage 3 at low pressure. This low pressure EGR device 30 is constructed to be provided with a low pressure EGR passage 31, a low pressure EGR valve 32, and an EGR cooler 33.

The low pressure EGR passage 31 serves to connect between a portion of the exhaust passage 4 at the downstream side of the filter 10 and a portion of the intake passage 3 at the upstream side of the compressor 5a and at the downstream side of the first intake throttle valve 6. The exhaust gas is recirculated through this low pressure EGR passage 31 at low pressure. In this embodiment, the exhaust gas being recirculated through the low pressure EGR passage 31 is called a low pressure EGR gas. Here, note that a portion of the low pressure EGR passage 31 at the side of the exhaust passage 4 need only be connected to a downstream side of the turbine 5b. In addition, a portion of the low pressure EGR passage 31 at the side of the intake passage 3 need only be connected to an upstream side of the compressor 5a.

In addition, by regulating the passage sectional area of the low pressure EGR passage 31, the low pressure EGR valve 32 adjusts the amount of the low pressure EGR gas flowing through the low pressure EGR passage 31. An opening sensor 34 for detecting the degree of opening of the low pressure EGR valve 32 is mounted on the low pressure EGR valve 32. Further, the EGR cooler 33 performs heat exchange between the low pressure EGR gas passing through the EGR cooler 33 and cooling water of the internal combustion engine 1, whereby the temperature of the low pressure EGR gas is reduced.

Moreover, the internal combustion engine 1 is equipped with a high pressure EGR device 40 that recirculates a part of the exhaust gas flowing through the exhaust passage 4 to the intake passage 3 at high pressure. This high pressure EGR device 40 is constructed to be provided with a high pressure EGR passage 41 and a high pressure EGR valve 42.

The high pressure EGR passage 41 serves to connect between the exhaust passage 4 upstream of the turbine 5b and the intake passage 3 downstream of the second intake throttle valve 9. The exhaust gas is recirculated through this high pressure EGR passage 41 at high pressure. In this embodiment, the exhaust gas being recirculated through the high pressure EGR passage 41 is called a high pressure EGR gas. Here, note that a portion of the high pressure EGR passage 41 at the side of the exhaust passage 4 need only be connected to a upstream side of the turbine 5b. In addition, a portion of the high pressure EGR passage 41 at the side of the intake passage 3 need only be connected to a downstream side of the compressor 5a.

Further, by regulating the passage sectional area of the high pressure EGR passage 41, the high pressure EGR valve 42 adjusts the amount of the high pressure EGR gas flowing through the high pressure EGR passage 41. An opening sensor 44 for detecting the degree of opening of the high pressure EGR valve 42 is mounted on the high pressure EGR valve 42. Here, note that in this embodiment, the opening sensor 44 corresponds to an opening detection device in the present invention.

In the internal combustion engine 1 constructed as stated above, there is arranged in combination therewith an ECU 20 which is an electronic control unit for controlling the internal combustion engine 1. This ECU 20 is a unit that controls the operating state of the internal combustion engine 1 in accordance with the operating conditions of the internal combustion engine 1 and/or driver's requirements.

In addition, besides the above-mentioned sensors, an accelerator opening sensor 15, which is able to detect the engine load by outputting an electrical signal corresponding to an amount by which a driver depressed an accelerator pedal 14, and a crank position sensor 16, which detects the number of revolutions per minute of the engine, are connected to the ECU 20 through wiring, and the output signals of the variety of kinds of sensors are inputted to the ECU 20. On the other hand, the first intake throttle valve 6, the second intake throttle valve 9, the low pressure EGR valve 32, and the high pressure EGR valve 42 are connected to the ECU 20 through wiring, so that these valves are controlled by means of the ECU 20.

Here, the ECU 20 makes a determination as to whether an EGR gas(es) is supplied from the low pressure EGR device 30, or from the high pressure EGR device 40, or from both of the devices, according to the operating state (e.g., the number of engine revolutions per minute and the engine load) of the internal combustion engine 1. Then, when the EGR gas is supplied, EGR feedback control is carried out. The EGR feedback control differs depending on individual cases where the EGR gas is supplied from only the low pressure EGR device 30, or the EGR gas is supplied from only the high pressure EGR device 40, or the EGR gas is supplied from both the low pressure EGR device 30 and the high pressure EGR device 40.

FIG. 2 is a view showing the relation between the number of engine revolutions per minute, the engine load, and the control modes of the EGR feedback control. In addition, FIG. 3 is a view showing a control method in each control mode.

When both the number of engine revolutions per minute and the engine load are low (i.e., in a low rotation and low load range), an EGR gas is supplied by the use of only the high pressure EGR device 40. This operating range is called an HPL range. Here, note that even when the temperature of the cooling water is low, an EGR gas is supplied by the use of only the high pressure EGR device 40. The EGR feedback control at this time is performed by adjusting the degree of opening of the high pressure EGR valve 42 in such a manner that the amount of intake air obtained by the air flow meter 7 becomes the target value thereof. The target value for the amount of intake air is determined according to the operating state (e.g., the number of engine revolutions per minute and the engine load) of the internal combustion engine 1. At this time, the low pressure EGR valve 32 is maintained in a fully closed state.

For example, in cases where the amount of intake air obtained by the air flow meter 7 is less than the target value thereof, the amount of EGR gas is assumed to be larger than the target value thereof, so the degree of opening of the high pressure EGR valve 42 is made smaller so as to decrease the amount of EGR gas. In addition, for example, in cases where the amount of intake air obtained by the air flow meter 7 is larger than the target value thereof, the amount of EGR gas is assumed to be less than the target value thereof, so the degree of opening of the high pressure EGR valve 42 is made In the following, the control mode to supply an EGR gas by the use of only the high pressure EGR device 40 is called an HPL mode. Here, note that the target value of the amount of intake air and the target value of the amount of EGR gas may also be made to have certain widths or margins as target ranges, respectively. In addition, in cases where the amount of EGR gas can be measured directly by means of a sensor or the like, the degree of opening of the high pressure EGR valve 42 may be adjusted in such a manner that the amount of EGR gas becomes the target value or the target range thereof.

Then, when at least one of the number of engine revolutions per minute and the engine load is high (i.e., in a high rotation range, or in a high load range), an EGR gas is supplied by the use of only the low pressure EGR device 30. This operating range is called an LPL range. The EGR feedback control at this time is performed by adjusting the degree of opening of the low pressure EGR valve 32 in such a manner that the amount of intake air obtained by the air flow meter 7 becomes the target value thereof. The target value for the amount of intake air is determined according to the operating state (e.g., the number of engine revolutions per minute and the engine load) of the internal combustion engine 1. At this time, the high pressure EGR valve 42 is maintained in a fully closed state.

For example, in cases where the amount of intake air obtained by the air flow meter 7 is less than the target value thereof, the amount of EGR gas is assumed to be larger than the target value thereof, so the degree of opening of the low pressure EGR valve 32 is made smaller so as to decrease the amount of EGR gas. In addition, for example, in cases where the amount of intake air obtained by the air flow meter 7 is larger than the target value thereof, the amount of EGR gas is assumed to be less than the target value thereof, so the degree of opening of the low pressure EGR valve 32 is made larger so as to increase the amount of EGR gas.

In the following, the control mode to supply an EGR gas by the use of only the low pressure EGR device 30 is called an LPL mode. Here, note that the target value of the amount of intake air and the target value of the amount of EGR gas may also be made to have certain margins as target ranges, respectively. In addition, in cases where the amount of EGR gas can be measured directly by means of a sensor or the like, the degree of opening of the low pressure EGR valve 32 may be adjusted in such a manner that the amount of EGR gas becomes the target value or the target range thereof.

In addition, a range between the HPL range and the LPL range is called an MPL range. The MPL range is an operating range at the time when at least one of the number of engine revolutions per minute and the engine load is in a middle range (a middle revolution range, or a middle load range). Also, this is an operating range in which the EGR gas is supplied by the use of both the low pressure EGR device 30 and the high pressure EGR device 40. The EGR feedback control at this time is performed by adjusting the degree of opening of the high pressure EGR valve 42 in such a manner that the amount of intake air obtained by the air flow meter 7 becomes the target value thereof. The target value for the amount of intake air is determined according to the operating state (e.g., the number of engine revolutions per minute and the engine load) of the internal combustion engine 1. Also, the degree of opening of the low pressure EGR valve 32 is determined according to the operating state (e.g., the number of engine revolutions per minute and the engine load) of the internal combustion engine 1. That is, the high pressure EGR valve 42 is controlled in a feedback manner, and the low pressure EGR valve 32 is controlled in an open loop manner.

For example, in cases where the amount of intake air obtained by the air flow meter 7 is less than the target value thereof, the amount of EGR gas is assumed to be larger than the target value thereof, so the degree of opening of the high pressure EGR valve 42 is made smaller so as to decrease the amount of EGR gas. In addition, for example, in cases where the amount of intake air obtained by the air flow meter 7 is larger than the target value thereof, the amount of EGR gas is assumed to be less than the target value thereof, so the degree of opening of the high pressure EGR valve 42 is made larger so as to increase the amount of EGR gas. Even in either case, the degree of opening of the low pressure EGR valve 32 is determined regardless of the amount of EGR gas and the amount of intake air.

In the following, the control mode to supply the EGR gas by the use of both the low pressure EGR device 30 and the high pressure EGR device 40 is called an MPL mode. Here, note that the target value of the amount of intake air and the target value of the amount of EGR gas may also be made to have certain margins as target ranges, respectively. In addition, in cases where the amount of EGR gas can be measured directly by means of a sensor or the like, the degree of opening of the high pressure EGR valve 42 may be adjusted in such a manner that the amount of EGR gas becomes the target value or the target range thereof.

Here, even if the degree of opening of the low pressure EGR valve 32 or the high pressure EGR valve 42 is adjusted in the EGR feedback control, the amount of intake air may not become the target value thereof. That is, the amount of EGR gas may increase or decrease too much, so that the amount of intake air can not be adjusted to the target value. In this embodiment, such a state is detected as a malfunction of the low pressure EGR device 30 or the high pressure EGR device 40.

At the time of the HPL mode and the LPL mode, the EGR gas is supplied only from one EGR device, so it is possible to make a determination of malfunction relatively easily.

That is, at the time of the HPL mode, the target value of the EGR ratio is compared with an actual value thereof, and for example, when this difference exceeds a threshold value, it can be determined that the high pressure EGR device 40 has a malfunction. Thus, the EGR ratio at the time of the HPL mode is caused to change only due to the amount of EGR gas supplied from the high pressure EGR device 40, so if the EGR ratio is out of the target range, it can be determined that the high pressure EGR device 40 has a malfunction.

Similarly, at the time of the LPL mode, too, the target value of the EGR ratio is compared with the actual value thereof, and for example, when this difference exceeds the threshold value, it can be determined that the low pressure EGR device 30 has a malfunction. That is, the EGR ratio at the time of the LPL mode is caused to change only due to the amount of EGR gas supplied from the low pressure EGR device 30, so if the EGR ratio is out of the target range, it can be determined that the low pressure EGR device 30 has a malfunction.

However, at the time of the MPL mode, only by detecting the amount of intake air or the amount of EGR gas in an engine cylinder, it is difficult to determine which of the low pressure EGR device 30 or the high pressure EGR device 40 has a malfunction. Accordingly, in this embodiment, the malfunction of the low pressure EGR device 30 or the high pressure EGR device 40 is detected based on the degree of opening of the high pressure EGR valve 42 at the time of the MPL mode. That is, if either of the devices has a malfunction and the EGR ratio is out of the target range, the degree of opening of the high pressure EGR valve 42 is adjusted, so it can be determined based on the degree of opening of the high pressure EGR valve 42 that the low pressure EGR device 30 or the high pressure EGR device 40 has a malfunction.

Here, note that in cases where it is determined that there is no malfunction in the high pressure EGR device 40 at the time of the HPL mode, whether the low pressure EGR device 30 has a malfunction can be determined based on the degree of opening of the high pressure EGR valve 42 at the time of the MPL mode. Similarly, in cases where it is determined that there is no malfunction in the low pressure EGR device 30 at the time of the LPL mode, whether the high pressure EGR device 40 has a malfunction can be determined based on the degree of opening of the high pressure EGR valve 42 at the time of the MPL mode.

Next, reference will be made to a technique of determining which of the devices has a malfunction in cases where it is determined based on the degree of opening of the high pressure EGR valve 42 at the time of the MPL mode that the low pressure EGR device 30 or the high pressure EGR device 40 has a malfunction. In this case, a determination can be made, for example, be using the supercharging pressure. This supercharging pressure is used as a value that is correlated with the amount of gas passing through the turbine 5b. As the value correlated with the amount of gas passing through the turbine 5b, the temperature of the exhaust gas can also be used besides the supercharging pressure. In addition, the amount of gas passing through the turbine 5b may be directly measured by a sensor. Furthermore, the ratio of the gas passing through the turbine 5b in the gas discharged from the internal combustion engine 1 may be used. The supercharging pressure falls as the amount of gas passing through the turbine decreases, whereas it rises as the amount of gas passing through the turbine increases. That is, when the amount of gas passing through the turbine decreases, the number of revolutions per minute of the turbine falls, so the number of revolutions per minute of the compressor also falls, as a result of which the supercharging pressure falls. Similarly, when the amount of gas passing through the turbine increases, the number of revolutions per minute of the turbine rises, so the number of revolutions per minute of the compressor also rises, as a result of which the supercharging pressure rises.

Here, although the amount of the high pressure EGR gas flowing through the high pressure EGR passage 41 affects the supercharging pressure, the amount of low pressure EGR gas flowing through the low pressure EGR passage 31 hardly affects the supercharging pressure. That is, the high pressure EGR passage 41 is connected to the exhaust passage 4 at a location upstream of the turbine, so when the amount of the high pressure EGR gas flowing through the high pressure EGR passage 41 increases, the amount of gas passing through the turbine accordingly decreases by the amount increased. Similarly, as the amount of the high pressure EGR gas flowing through the high pressure EGR passage 41 decreases, the amount of the gas passing through the turbine accordingly increases by the amount decreased. On the other hand, because the low pressure EGR passage 31 is connected to the exhaust passage 4 at a location downstream of the turbine, the exhaust gas having passed through the turbine is taken into the low pressure EGR passage. Accordingly, even if the amount of the low pressure EGR gas flowing through the low pressure EGR passage 31 has changed, no change will occur in the amount of the gas passing through the turbine.

Here, FIG. 4 is a time chart showing the changes over time of the amount of intake air, the degree of opening of the low pressure EGR valve, the degree of opening of the high pressure EGR valve, and the supercharging pressure, at the time when the amount of the low pressure EGR gas flowing through the low pressure EGR passage 31 decreases to a value less than that at the time of normal operation. A solid line indicates a normal case, and a broken line indicates an abnormal case, i.e., a case in which the amount of the low pressure EGR gas flowing through the low pressure EGR passage 31 has decreased to a value less than that at the time of normal operation.

In cases where the amount of the low pressure EGR gas flowing through the low pressure EGR passage 31 decreases to a value less than that at the time of normal operation, the amount of intake air increases in accordance with the decreasing amount of EGR gas. Even in such a case, the degree of opening of the low pressure EGR valve 32 does not change because of the open loop control thereof. On the other hand, the high pressure EGR valve 42 is caused to increase its degree of opening, so that the amount of high pressure EGR gas is increased so as to decrease the amount of intake air. Then, due to the increased degree of opening of the high pressure EGR valve 42, the amount of gas passing through the turbine 5b is decreased, so the supercharging pressure falls.

That is, because the supercharging pressure has fallen, it can be determined that there is a malfunction in the low pressure EGR device 30 in which the amount of the low pressure EGR gas flowing through the low pressure EGR passage 31 becomes less than that at the time of normal operation. Here, note that the malfunction in which the amount of EGR gas flowing through the low pressure EGR passage 31 or the high pressure EGR passage 41 decreases to a value less than that at the time of normal operation occurs, for example, in cases where particulate matter in the exhaust gas adheres to such a passage so that the cross sectional area of the passage becomes smaller or the passage is clogged.

Here, note that in cases where the amount of intake air comes into the target range thereof by adjusting the degree of opening of the high pressure EGR valve 42, the amount of EGR gas can be controlled by means of EGR feedback control. In this case, it can be said that the EGR system is normal. That is, the case where it is determined that the EGR system is abnormal or in a malfunction is a case where the amount of intake air does not enter the target range even by EGR feedback control.

Next, FIG. 5 is a time chart showing the changes over time of the amount of intake air, the degree of opening of the low pressure EGR valve, the degree of opening of the high pressure EGR valve, the supercharging pressure, and an EGR ratio difference, at the time when the amount of the high pressure EGR gas flowing through the high pressure EGR passage 41 decreases to a value less than that at the time of normal operation. A solid line indicates a normal case, and a broken line indicates an abnormal case, i.e., a case in which the amount of the high pressure EGR gas flowing through the high pressure EGR passage 41 has decreased to a value less than that at the time of normal operation. Here, note that the EGR ratio difference is the absolute value of a difference between a target value of the EGR ratio, and an actual value thereof.

In cases where the amount of the high pressure EGR gas flowing through the high pressure EGR passage 41 decreases to a value less than that at the time of normal operation, the amount of intake air increases in accordance with the decreasing amount of EGR gas. At this time, the degree of opening of the low pressure EGR valve 32 does not change because of the open loop control thereof. On the other hand, the high pressure EGR valve 42 is caused to increase its degree of opening, so that the amount of high pressure EGR gas is increased so as to decrease the amount of intake air. However, even if the degree of opening of the high pressure EGR valve 42 is made larger, the amount of the high pressure EGR gas flowing through the high pressure EGR passage 41 will not be increased to a sufficient extent in cases where the high pressure EGR passage 41 is clogged, etc. Therefore, the amount of gas passing through the turbine changes little, so the supercharging pressure does not substantially change, either. That is, in the MPL mode, it is difficult to determine, even only by looking at the supercharging pressure, whether the high pressure EGR device 40 is abnormal.

Here, note that, as stated before, in cases where the amount of intake air comes into the target range thereof by adjusting the degree of opening of the high pressure EGR valve 42, it is assumed that the amount of EGR gas can be controlled by means of EGR feedback control, and so it is not determined that the ECR system is abnormal. That is, the case where it is determined that the EGR system is abnormal is a case where the amount of intake air does not enter the target range even by EGR feedback control.

However, when the amount of high pressure EGR gas decreases, the EGR ratio falls below the target value thereof, so the EGR ratio difference becomes larger. For this reason, the malfunction of the high pressure EGR device 40 can be determined based on the EGR ratio difference. That is, in cases where the amount of the high pressure EGR gas flowing through the high pressure EGR passage 41 decreases to a value less than that at the time of normal operation, the amount of EGR gas becomes insufficient irrespective of the degree of opening of the high pressure EGR valve 42. Therefore, the actual EGR ratio becomes lower than the target value thereof, so the EGR ratio difference becomes larger. For example, if the EGR ratio difference becomes larger than a threshold value, it is determined that the high pressure EGR device 40 has a malfunction. Here, note that the target value of the EGR ratio may have a margin. In this case, when the EGR ratio is out of the target range, the EGR ratio difference becomes larger than the threshold value.

Here, note that in cases where the amount of the low pressure EGR gas flowing through the low pressure EGR passage 31 decreases to a value less than that at the time of normal operation, a malfunction can be detected by the use of the supercharging pressure, as mentioned above, but a malfunction can also be detected by the use of the EGR ratio difference. That is, when the amount of low pressure EGR gas decreases, the EGR ratio falls below the target value thereof, so the EGR ratio difference becomes larger. For this reason, the malfunction of the low pressure EGR device 30 can be determined based on the EGR ratio difference. That is, in cases where the amount of the low pressure EGR gas flowing through the low pressure EGR passage 31 decreases to a value less than that at the time of normal operation, the amount of EGR gas becomes insufficient even if the degree of opening of the high pressure EGR valve 42 is made larger. Therefore, the actual EGR ratio becomes lower than the target value thereof, so the EGR ratio difference becomes larger. For example, if the EGR ratio difference becomes larger than the threshold value at the time when the high pressure EGR device 40 is normal, it is determined that the low pressure EGR device 30 has a malfunction. Here, note that the target value of the EGR ratio may have a margin. In this case, when the EGR ratio is out of the target range, the EGR ratio difference becomes larger than the threshold value.

Next, FIG. 6 is a time chart showing the changes over time of the amount of intake air, the degree of opening of the low pressure EGR valve, the degree of opening of the high pressure EGR valve, and the supercharging pressure, at the time when the amount of the low pressure EGR gas flowing through the low pressure EGR passage 31 increases to a value more than that at the time of normal operation. A solid line indicates a normal case, and a broken line indicates an abnormal case, i.e., a case in which the amount of the low pressure EGR gas flowing through the low pressure EGR passage 31 has increased to a value more than that at the time of normal operation.

In cases where the amount of the low pressure EGR gas flowing through the low pressure EGR passage 31 increases to a value more than that at the time of normal operation, the amount of intake air decreases in accordance with the increasing amount of EGR gas. Even in such a case, the degree of opening of the low pressure EGR valve 32 does not change because of the open loop control thereof. On the other hand, the high pressure EGR valve 42 is caused to decrease its degree of opening, so that the amount of high pressure EGR gas is decreased so as to increase the amount of intake air. Then, due to the decreased degree of opening of the high pressure EGR valve 42, the amount of gas passing through the turbine is increased, so the supercharging pressure rises.

That is, due to the rise of the supercharging pressure, it can be determined that there is a malfunction in the low pressure EGR device 30 in which the amount of the low pressure EGR gas flowing through the low pressure EGR passage 31 becomes more than that at the time of normal operation. Here, note that the malfunction in which the amount of EGR gas flowing through the low pressure EGR passage 31 or the high pressure EGR passage 41 increases to a value more than that at the time of normal operation occurs, for example, due to the damage of the low pressure EGR valve 32 or the high pressure EGR valve 42.

Next, FIG. 7 is a time chart showing the changes over time of the amount of intake air, the degree of opening of the low pressure EGR valve, the degree of opening of the high pressure EGR valve, the supercharging pressure, and an EGR ratio difference, at the time when the amount of the high pressure EGR gas flowing through the high pressure EGR passage 41 increases to a value more than that at the time of normal operation. A solid line indicates a normal case, and a broken line indicates an abnormal case, a case in which the amount of the high pressure EGR gas flowing through the high pressure EGR passage 41 has increased to a value more than that at the time of normal operation.

In cases where the amount of the high pressure EGR gas flowing through the high pressure EGR passage 41 increases to a value more than that at the time of normal operation, the amount of intake air decreases in accordance with the increasing amount of EGR gas. At this time, the degree of opening of the low pressure EGR valve 32 does not change because of the open loop control thereof. On the other hand, the high pressure EGR valve 42 is caused to decrease its degree of opening, so that the amount of high pressure EGR gas is decreased so as to increase the amount of intake air. However, even if the degree of opening of the high pressure EGR valve 42 is made smaller, the amount of the high pressure EGR gas flowing through the high pressure EGR passage 41 will not be decreased to a sufficient extent in cases where the high pressure EGR valve 42 is broken, etc. Therefore, the amount of gas passing through the turbine changes little, so the supercharging pressure does not substantially change, either. However, the supercharging pressure becomes lower than that at the time of normal operation by an increase in the amount of the high pressure EGR gas flowing through the high pressure EGR passage 41.

In such a case, the EGR ratio becomes larger than the target value thereof due to the increase of the amount of high pressure EGR gas, so the EGR ratio difference becomes larger. For this reason, the malfunction of the high pressure EGR device 40 can be determined based on the EGR ratio difference. That is, in cases where the amount of the high pressure EGR gas flowing through the high pressure EGR passage 41 increases to a value more than that at the time of normal operation, the amount of EGR gas becomes excessive irrespective of the degree of opening of the high pressure EGR valve 42. Therefore, the actual EGR ratio becomes higher than the target value thereof, so the EGR ratio difference becomes larger. For example, if the EGR ratio difference becomes larger than a threshold value, it is determined that the high pressure EGR device 40 has a malfunction. Here, note that the target value of the EGR ratio may have a margin. In this case, when the EGR ratio becomes out of the target range, the EGR ratio difference becomes larger than the threshold value.

Here, note that in cases where the amount of the low pressure EGR gas flowing through the low pressure EGR passage 31 increases to a value more than that at the time of normal operation, a malfunction can be detected by the use of the supercharging pressure, as mentioned above, but a malfunction can also be detected by the use of the EGR ratio difference. That is, when the amount of low pressure EGR gas increases, the EGR ratio becomes more than the target value thereof, so the EGR ratio difference becomes larger. For this reason, the malfunction of the low pressure EGR device 30 can be determined based on the EGR ratio difference. That is, in cases where the amount of the low pressure EGR gas flowing through the low pressure EGR passage 31 increases to a value less than that at the time of normal operation, the amount of EGR gas becomes excessive even if the degree of opening of the high pressure EGR valve 42 is made smaller. Therefore, the actual EGR ratio becomes higher than the target value thereof, so the EGR ratio difference becomes larger. For example, if the EGR ratio difference becomes larger than the threshold value at the time when the high pressure EGR device 40 is normal, it is determined that the low pressure EGR device 30 has a malfunction. Here, note that the target value of the EGR ratio may have a margin. In this case, when the EGR ratio is out of the target range, the EGR ratio difference becomes larger than the threshold value.

Next, reference will be made to the flow of determining a malfunction of the EGR system according to this embodiment. FIGS. 8, 9 and 10 are flow charts showing the flow of determining a malfunction of the EGR system according to the first embodiment. In the flows shown in FIGS. 8, 9 and 10, a malfunction in which the flow rate of EGR gas decreases to a value less than that at the time of normal operation can be detected in any of these flows. These routines shown therein are carried out by means of the ECU 20 in a repeated manner at each predetermined time interval. FIG. 8 shows a determination flow at the time of the HPL mode, FIG. 9 shows a determination flow at the time of the MPL mode, and FIG. 10 shows the determination flow at the time of the LPL mode.

First of all, FIG. 8 will be described. In step S101, it is determined whether preconditions for determining a malfunction of the EGR system are satisfied. For example, if EGR feedback control is not executed, it is difficult to determine a malfunction of the EGR system from the degree of opening of the low pressure EGR valve 32 or the high pressure EGR valve 42, so the execution of EGR feedback control is made one of the preconditions. In addition, if the internal combustion engine 1 is not in operation, an EGR gas will not be supplied, so a condition that the internal combustion engine 1 is in operation is made one of the preconditions. Moreover, when the supercharging pressure is controlled in a feedback manner, it is made to match its target value irrespective of the amount of EGR gas, so it becomes impossible to determine the malfunction of the EGR system based on the amount of the supercharging pressure. Accordingly, a condition that the supercharging pressure is controlled in an open loop manner is made one of the preconditions. These preconditions, being control operations that are carried out by the ECU 20, can be easily determined by the ECU 20.

Unless a sensor used at the time when the malfunction of the EGR system is determined is normal, a determination as to the malfunction of the EGR system is made based on incorrect information, so a condition that the sensor used is normal is made one of the preconditions. Whether the sensor is normal or abnormal is detected by using other well-known techniques. Further, if the amount of intake air is too much or too little, the operating state of the internal combustion engine 1 will get worse, and hence it will become difficult to determine the malfunction of the EGR system from the degree of opening of the high pressure EGR valve 42. Thus, a condition that the amount of intake air is in a reference range may be made one of the preconditions. When all of these preconditions are satisfied, an affirmative determination is made in step S101.

Then, in cases where an affirmative determination is made in step S101, the routine advances to step S102, whereas in cases where a negative determination is made, this routine is once terminated because a determination as to the malfunction of the EGR system can not be made.

In step S102, the control mode of the EGR system is determined. That is, it is determined in which of the HPL mode, the MPL mode and the LPL mode an EGR gas is supplied. For example, the control mode is determined from the operating state of the internal combustion engine 1 and the relation shown in FIG. 2.

In step S103, it is determined whether the control mode obtained in step S102 is the HPL mode. In cases where an affirmative determination is made in step S103, the routine advances to step S104, whereas in cases where a negative determination is made, the routine advances to step S201 in FIG. 9.

In step S104, it is determined whether the internal combustion engine 1 is in a steady operation. That is, it is determined whether the number of engine revolutions per minute and the engine load of the internal combustion engine 1 are constant. In this connection, it is to be noted that if the internal combustion engine 1 is not in the steady operation, the EGR ratio, the supercharging pressure, and the following various kinds of threshold values will change, and hence it is difficult to determine the malfunction of the EGR system. Accordingly, in this embodiment, such a determination is made only at the time of steady operation. In cases where an affirmative determination is made in step S104, the routine advances to step S105, whereas in cases where a negative determination is made, this routine is once terminated because a determination as to the malfunction of the EGR system can not be made.

In step S105, an increase in the amount of intake air is detected by means of the air flow meter 7. That is, it is detected by the air flow meter 7 that the amount of intake air has increased due to a decrease in the amount of EGR gas.

In step S106, the high pressure EGR valve 42 is adjusted so that it is put to a more open side than at the present time. In this step, the degree of opening of the high pressure EGR valve 42 is made larger by means of feedback control based on the amount of intake air. Here, only the degree of opening of the high pressure EGR valve 42 is adjusted. The extent to which the degree of opening of the high pressure EGR valve 42 is increased may also be a specified value that has been set beforehand, or may also be a value corresponding to the degree of increase in the amount of intake air.

In step S107, the degree of opening of the high pressure EGR valve 42 is detected. That is, the value of the opening sensor 44 is read in.

In step S108, it is determined whether the degree of opening of the high pressure EGR valve 42 is larger than a threshold value. The threshold value is an upper limit value of a range in which the degree of opening of the high pressure EGR valve 42 can be changed in cases where there is no malfunction in the EGR system. If there is no malfunction in the EGR system, the degree of opening of the high pressure EGR valve 42 will fall in a specified range, whereas if there is a malfunction in the EGR system, the degree of opening of the high pressure EGR valve 42 will fall out of the specified range. That is, the threshold value may also be an upper limit of the degree of opening of the high pressure EGR valve 42 within which the EGR system can be said to be normal. Thus, in this step, a determination is made as to whether the degree of opening of the high pressure EGR valve 42 is in a range in which the EGR system can be said to be abnormal. In addition, because the degree of opening of the high pressure EGR valve 42 changes in accordance with the operating state (e.g., the number of engine revolutions per minute and the engine load) of the internal combustion engine 1, the threshold value is also caused to change in accordance with the operating state of the internal combustion engine 1 in a similar manner. In addition, the threshold value is beforehand obtained through experiments, etc. in cases where an affirmative determination is made in step S108, the routine advances to step S109, whereas in cases where a negative determination is made, it is assumed that there is no shortage in the amount of high pressure EGR gas in the HPL mode, and this routine is once terminated.

In step S109, it is determined whether the absolute value of a difference (i.e., EGR ratio difference) between a target EGR ratio and an estimated EGR ratio is greater than a threshold value. The target EGR ratio is set in accordance with the number of engine revolutions per minute and the engine load. Here, note that the estimated EGR ratio may also be an actual EGR ratio. The EGR ratio is a ratio of the amount of EGR gas to the total amount of gas flowing into each cylinder 2. When assuming that the gas flowing into a cylinder is the EGR gas and air, the estimated EGR ratio can be obtained by the following formula.

> The estimated EGR ratio=(the amount of gas flowing into a cylinder–the amount of intake air)/(the amount of gas flowing into the cylinder)

However, the amount of intake air is a value obtained by means of the air flow meter 7. In addition, the amount of gas flowing into a cylinder is calculated based on the amount of intake air obtained by the air flow meter 7, the pressure and the temperature in the exhaust passage 4 upstream of the turbine 5*b*, the pressure in the intake passage 3 downstream of the second intake throttle valve 9 (the pressure obtained by the pressure sensor 12), and so on. A well-known formula can be used for the calculation of the amount of gas flowing into the cylinder. The pressure and the temperature in the exhaust passage 4 upstream of turbine may be actually measured by a sensor arranged therein, or may be estimated by a well-known method. Here, note that in this embodiment, the ECU 20 which calculates the estimated EGR ratio corresponds to an estimation unit in the present invention.

In addition, the threshold value in step S109 is the upper limit of the target range of the EGR ratio difference. If there is no malfunction in the EGR system, the EGR ratio difference will fall in the target range. This can be said that the EGR ratio is in its target range. Accordingly, the threshold value can be said to be an upper limit value of a range in which the EGR ratio can be changed in cases where there is no malfunction in the EGR system. That is, in this step, a determination is made as to whether the EGR ratio difference is in a range in which the EGR system can be said to be abnormal. The threshold value is a value set according to the number of engine revolutions per minute and the engine load, and is calculated beforehand through experiments, etc.

In step S110, an elapsed time is counted up. This elapsed time is an elapsed time after an affirmative determination has been made in step S109.

In step S111, it is determined whether the elapsed time is longer than a threshold value. For example, in each of steps S108 and 109, an affirmative determination may be made due to a certain influence received from the outside of the EGR system. In this case, too, it is not desirable to determine that there is a malfunction in the EGR system. As a consequence, only when the same state has continued for a certain period of time, a determination is made that there is a malfunction in the EGR system. Accordingly, the threshold value in this step is set as a period of time required to determine the malfunction of the EGR system. That is, in this step, it is determined whether a period of time in which the degree of opening of the high pressure EGR valve 42 is larger than its threshold value and the EGR ratio difference is larger than its threshold value is longer than a threshold value. This can be said that a determination is made as to whether the EGR system really has a malfunction. In cases where an affirmative determination is made in step S111, the routine advances to step S112, where a determination is made that the high pressure EGR device 40 has a malfunction in which the flow rate of the high pressure EGR gas decreases. On the other hand, in cases where a negative determination is made in step S111, it is determined in step S113 that the high pressure EGR device 40 is normal.

Next, FIG. 9 will be described. In step S201, it is determined whether the control mode is the MPL mode. Because in the above-mentioned step S103, it has been determined that the control mode is not the HPL mode, a determination is made here as to which one of the MPL mode and the LPL mode the control mode is. In cases where an affirmative determination is made in step S201, the routine advances to step S202, whereas in cases where a negative determination is made, the routine advances to step S301 in FIG. 10.

In steps from S202 to S206, the same processings as those in the above-mentioned steps from S104 to S108 are carried out. Then, in cases where an affirmative determination is made in step S206, the routine advances to step S207.

In step S207, the supercharging pressure is detected. The supercharging pressure is the pressure in the intake passage 3 obtained by the pressure sensor 12.

In step S208, it is determined whether the supercharging pressure is lower than a threshold value. Here, in cases where the amount of low pressure EGR gas is decreasing due to the malfunction of the low pressure EGR device 30, the supercharging pressure falls due to the increased degree of opening of the high pressure EGR valve 42. On the other hand, in cases where the amount of high pressure EGR gas is decreasing due to the malfunction of the high pressure EGR device 40, the amount of high pressure EGR gas changes little even if the degree of opening of the high pressure EGR valve 42 is made larger, so the supercharging pressure does not substantially change, either. For this reason, in cases where the supercharging pressure is lower than a reference range, there is a possibility that the low pressure EGR device 30 may have a malfunction, whereas in cases where the supercharging pressure is in the vicinity of, or in, the reference range, there is a possibility that the high pressure EGR device 40 may have a malfunction. That is, in this step, a determination is made as to whether there is a possibility that the low pressure EGR device 30 may have a malfunction.

Here, note that the threshold value in step S208 is a lower limit of a range (reference range) in which the supercharging pressure can change in cases where there is no malfunction in the EGR system. If there is no malfunction in the low pressure EGR device 30, the supercharging pressure falls in the reference range, whereas if there is a malfunction in the low pressure EGR device 30, the supercharging pressure falls out of the reference range. This reference range is set according to the operating state (e.g., the number of engine revolutions per minute and the engine load) of the internal combustion engine 1. In addition, the reference range may also be a target supercharging pressure that is set according to the operating state of the internal combustion engine 1. In cases where an affirmative determination is made in step S208, the routine advances to step S209, whereas in cases where a negative determination is made, the routine advances to step S213.

In steps S209 and S210, the same processings as those in the above-mentioned steps S110 and S111 are carried out. Here, note that in step S210, it is determined whether a period of time in which the degree of opening of the high pressure EGR valve 42 is larger than its threshold value and the supercharging pressure is lower than its threshold value is longer than a threshold value. In cases where an affirmative determination is made in step S210, the routine advances to step S211, where a determination is made that the low pressure EGR device 30 has a malfunction in which the flow rate of the high pressure EGR gas decreases. On the other hand, in cases where a negative determination is made in step S210, it is determined in step S212 that the low pressure EGR device 30 is normal. Here, note that in this embodiment, the ECU 20 which performs the processings of steps S206 to S211 corresponds to a detection unit in the present invention.

Then, in steps from S213 to S217, the same processings as those in the above-mentioned steps from S109 to S113 are carried out. Here, note that in step S215, it is determined whether a period of time, in which the degree of opening of the high pressure EGR valve 42 is larger than its threshold value, the supercharging pressure is lower than its threshold value, and the EGR ratio difference is larger than its threshold value, is longer than a threshold value. In cases where an affirmative determination is made in step S215, the routine advances to step S216, where a determination is made that the high pressure EGR device 40 has a malfunction in which the flow rate of the high pressure EGR gas decreases. On the other hand, in cases where a negative determination is made in step S215, it is determined in step S217 that the high pressure EGR device 40 is normal.

Here, note that in cases where it has become clear that there is no malfunction in the high pressure EGR device 40, there is no need for the determination of step S208. For this reason, the malfunction of the low pressure EGR device 30 can be determined based on the degree of opening of the high pressure EGR valve 42. In this case, in place of the step S208, a determination may be made as to whether the EGR ratio difference is larger than its threshold value. That is, the same processing as that in step S109 may be carried out. In cases where the low pressure EGR device 30 has a malfunction, as mentioned above, the EGR ratio does not come in its target range even if the degree of opening of the high pressure EGR valve 42 is adjusted. For this reason, the EGR ratio difference becomes larger. Then, if the EGR ratio difference is used in combination with the degree of opening of the high pressure EGR valve 42 at the time when the malfunction of the low pressure EGR device 30 is detected, the detection accuracy thereof can be made higher. Here, note that after the processing in step S208, a determination may be made as to whether the EGR ratio difference is larger than its threshold value. That is, if the malfunction of the low pressure EGR device 30 is detected based on both the supercharging pressure and the EGR ratio difference, the detection accuracy thereof can be enhanced to a more extent.

On the other hand, if the determination in step S208 is carried out even in cases where it has become clear that there is no malfunction in the high pressure EGR device 40, the accuracy of detection of the malfunction of the low pressure EGR device 30 can be improved to a much more extent.

In addition, in cases where in place of the step S208, it is determined whether the EGR ratio difference is larger than its threshold value, a determination may be made in combination therewith whether the amount of intake air is in the reference range. This reference range is obtained beforehand through experiments, etc., as a range of the amount of intake air in which a misfire does not occur in the internal combustion engine 1. That is, when a misfire occurs, the EGR ratio difference may be influenced, and hence, in order to enhance the detection accuracy of the malfunction of the low pressure EGR device 30, a determination of the malfunction may be carried out only in cases where no misfire occurs.

Next, FIG. 10 will be described. The flow after the step S301 is carried out when it is determined in the above-mentioned step S103 that the control mode is not the HPL mode and when it is also determined in the above-mentioned step S201 that the control mode is not the MPL mode, so it is a flow that is executed in the case of the LPL mode.

In steps S301 and S302, the same processings as those in the above-mentioned steps S104 and 105 are carried out.

In step S303, the low pressure EGR valve 32 is adjusted so that it is put to a more open side than at the present time. In this step, the degree of opening of the low pressure EGR valve 32 is made larger by means of feedback control based on the amount of intake air. Here, because of the LPL mode, only the degree of opening of the low pressure EGR valve 32 is adjusted. The extent to which the degree of opening of the low pressure EGR valve 32 is increased may also be a specified value that has been set beforehand, or may also be a value corresponding to the degree of increase in the amount of intake air.

In step S304, the degree of opening of the low pressure EGR valve 32 is detected. That is, the value of the opening sensor 34 is read in.

In step S305, it is determined whether the degree of opening of the low pressure EGR valve 32 is larger than a threshold value. The threshold value is an upper limit value of a range in which the degree of opening of the low pressure EGR valve 32 can be changed in cases where there is no malfunction in the EGR system. If there is no malfunction in the EGR system, the degree of opening of the low pressure EGR valve 32 will fall in a specified range, whereas if there is a malfunction in the EGR system, the degree of opening of the low pressure EGR valve 32 will fall out of the specified range. That is, the threshold value may also be an upper limit of the degree of opening of the low pressure EGR valve 32 within which the EGR system can be said to be normal. Thus, in this step, a determination is made as to whether the degree of opening of the low pressure EGR valve 32 is in a range in which the EGR system can be said to be abnormal. In addition, because the degree of opening of the low pressure EGR valve 32 changes in accordance with the operating state (e.g., the number of engine revolutions per minute and the engine load) of the internal combustion engine 1, the threshold value is also caused to change in accordance with the operating state of the internal combustion engine 1 in a similar manner. In addition, the threshold value is beforehand obtained through experiments, etc. In cases where an affirmative determination is made in step S305, the routine advances to step S306, whereas in cases where a negative determination is made, it is assumed that there is no shortage in the amount of low pressure EGR gas in the LPL mode, and this routine is once terminated.

In steps from S306 to S308, the same processings as those in the above-mentioned steps from S109 to 111 are carried out. Here, note that in step S308, it is determined whether a period of time in which the degree of opening of the low pressure EGR valve 32 is larger than its threshold value and the EGR ratio difference is larger than its threshold value is longer than a threshold value. In cases where an affirmative determination is made in step S308, the routine advances to step S309, where a determination is made that the low pressure EGR device 30 has a malfunction in which the flow rate of the low pressure EGR gas decreases. On the other hand, in cases where a negative determination is made in step S308, it is determined in step S310 that the low pressure EGR device 30 is normal.

Next, FIGS. 11, 12 and 13 are flow charts showing the flow of determining a malfunction of the EGR system according to this embodiment. In the flows shown in FIGS. 11, 12 and 13, a malfunction in which the flow rate of EGR gas increases to a value more than that at the time of normal operation can be detected in any of these flows. These routines shown therein are carried out by means of the ECU 20 in a repeated manner at each predetermined time interval. FIG. 11 shows a determination flow at the time of the HPL mode, FIG. 12 shows a determination flow at the time of the MPL mode, and FIG. 13 shows the determination flow at the time of the LPL mode.

First, FIG. 11 will be described. In steps from S401 to S404, the same processings as those in the above-mentioned steps from S101 to S104 are carried out. In cases where a negative determination is made in step S403, the routine advances to step S501 in FIG. 12. In cases where an affirmative determination is made in step S404, the routine advances to step S405, whereas in cases where a negative determination is made, this routine is once terminated because a determination as to the malfunction of the EGR system can not be made.

In step S405, a decrease in the amount of intake air is detected by means of the air flow meter 7. That is, it is detected by the air flow meter 7 that the amount of intake air has decreased due to an increase in the amount of EGR gas.

In step S406, the high pressure EGR valve 42 is adjusted so that it is put to a more closed side than at the present time. In this step, the degree of opening of the high pressure EGR valve 42 is made smaller by means of feedback control based on the amount of intake air. Here, only the degree of opening of the high pressure EGR valve 42 is adjusted. The extent to which the degree of opening of the high pressure EGR valve 42 is decreased may also be a specified value that has been set beforehand, or may also be a value corresponding to the degree of decrease in the amount of intake air.

In step S407, the same processing as that in the above-mentioned step S107 is carried out. Then, in step S408, it is determined whether the degree of opening of the high pressure EGR valve 42 is smaller than a threshold value. The threshold value is a lower limit value of a range in which the degree of opening of the high pressure EGR valve 42 can be changed in cases where there is no malfunction in the EGR system. If there is no malfunction in the EGR system, the degree of opening of the high pressure EGR valve 42 will fall in a specified range, whereas if there is a malfunction in the EGR system, the degree of opening of the high pressure EGR valve 42 will fall out of the specified range. This specified range is the same as the specified range in step S108. That is, the threshold value may also be a lower limit of the degree of opening of the high pressure EGR valve 42 within which the EGR system can be said to be normal. Thus, in this step, a determination is made as to whether the degree of opening of the high pressure EGR valve 42 is in a range in which the EGR system can be said to be abnormal. Moreover, because the degree of opening of the high pressure EGR valve 42 changes in accordance with the operating state (e.g., the number of engine revolutions per minute and the engine load) of the internal combustion engine 1, the threshold value is also caused to change in accordance with the operating state of the internal combustion engine 1 in a similar manner. In addition, the threshold value is beforehand obtained through experiments, etc. In cases where an affirmative determination is made in step S408, the routine advances to step S409, whereas in cases where a negative determination is made, it is assumed that there is no excess in the amount of high pressure EGR gas in the HPL mode, and this routine is once terminated.

In steps from S409 to S411, the same processings as those in the above-mentioned steps from S109 to 111 are carried out. Here, note that in step S411, it is determined whether a period of time in which the degree of opening of the high pressure EGR valve 42 is smaller than its threshold value and the EGR ratio difference is larger than its threshold value is longer than a threshold value. In cases where an affirmative determination is made in step S411, the routine advances to step S412, where a determination is made that the high pressure EGR device 40 has a malfunction in which the flow rate of the high pressure EGR gas increases. On the other hand, in cases where a negative determination is made in step S411, it is determined in step S413 that the high pressure EGR device 40 is normal.

Next, FIG. 12 will be described. In step S501, the same processing as that in step S201 is carried out. In cases where an affirmative determination is made in step S501, the routine advances to step S502, whereas in cases where a negative determination is made, the routine advances to step S601 in FIG. 13.

In steps from S502 to S506, the same processings as those in the above-mentioned steps from S404 to 408 are carried out. Then, in cases where an affirmative determination is made in step S506, the routine advances to step S507.

In step S507, the same processing as that in step S207 is carried out. Then, in step S508, it is determined whether the supercharging pressure is higher than a threshold value. Here, in cases where the amount of low pressure EGR gas is increasing due to the malfunction of the low pressure EGR device 30, the supercharging pressure rises due to the decreased degree of opening of the high pressure EGR valve 42. On the other hand, in cases where the amount of high pressure EGR gas is increasing due to the malfunction of the high pressure EGR device 40, the amount of high pressure EGR gas changes little even if the degree of opening of the high pressure EGR valve 42 is made smaller, so the supercharging pressure does not substantially change, either. Here, note that in cases where the amount of high pressure EGR gas is increasing due to the malfunction of the high pressure EGR device 40, the supercharging pressure becomes lower than that at the time of normal operation irrespective of the degree of opening of the high pressure EGR valve 42. For this reason, in cases where the supercharging pressure is higher than the reference range, there is a possibility that the low pressure EGR device 30 may have a malfunction, whereas in cases where the supercharging pressure is within or lower than the reference range, there is a possibility that the high pressure EGR device 40 may have a malfunction. That is, in this step, a determination is made as to whether there is a possibility that the low pressure EGR device 30 may have a malfunction.

Here, note that the threshold value in step S508 is an upper limit of a range (reference range) in which the supercharging pressure can change in cases where there is no malfunction in the EGR system. This reference range is the same as the reference range in step S208. If there is no malfunction in the low pressure EGR device 30, the supercharging pressure falls in the reference range, whereas if there is a malfunction in the low pressure EGR device 30, the supercharging pressure falls out of the reference range. This reference range is set according to the operating state (e.g., the number of engine revolutions per minute and the engine load) of the internal combustion engine 1. In addition, the reference range may also be a target supercharging pressure that is set according to the operating state of the internal combustion engine 1. In cases where an affirmative determination is made in step S508, the routine advances to step S509, whereas in cases where a negative determination is made, the routine advances to step S513. Here, note that in this embodiment, the ECU 20 which performs the processings of steps S508 to S511 corresponds to a detection unit in the present invention.

In steps S509 and S510, the same processings as those in the above-mentioned steps S110 and S111 are carried out. Here, note that in step S510, it is determined whether a period of time in which the degree of opening of the high pressure EGR valve 42 is smaller than its threshold value and the supercharging pressure is higher than its threshold value is longer than a threshold value. In cases where an affirmative determination is made in step S510, the routine advances to step S511, where a determination is made that the low pressure EGR device 30 has a malfunction in which the flow rate of the high pressure EGR gas increases. On the other hand, in cases where a negative determination is made in step S510, it is determined in step S512 that the low pressure EGR device 30 is normal.

Then, in steps from S513 to S515, the same processings as those in the above-mentioned steps from S109 to S111 are carried out. Here, note that in step S515, it is determined whether a period of time, in which the degree of opening of the high pressure EGR valve 42 is smaller than its threshold value, the supercharging pressure is equal to or lower than its threshold value, and the EGR ratio difference is larger than its threshold value, is longer than a threshold value. In cases where an affirmative determination is made in step S515, the routine advances to step S516, where a determination is made that the high pressure EGR device 40 has a malfunction in which the flow rate of the high pressure EGR gas increases. On the other hand, in cases where a negative determination is made in step S515, it is determined in step S517 that the high pressure EGR device 40 is normal.

Here, note that in cases where it has become clear that there is no malfunction in the high pressure EGR device 40, there is no need for the determination of step S508. For this reason, the malfunction of the low pressure EGR device 30 can be determined based on the degree of opening of the high pressure EGR valve 42. In this case, in place of the step S508, a determination may be made as to whether the EGR ratio difference is larger than its threshold value. That is, the same processing as that in step S109 may be carried out. In cases where the low pressure EGR device 30 has a malfunction, as mentioned above, the EGR ratio does not come in its target range even if the degree of opening of the high pressure EGR valve 42 is adjusted. For this reason, the EGR ratio difference becomes larger. Then, if the EGR ratio difference is used in combination with the degree of opening of the high pressure EGR valve 42 at the time when the malfunction of the low pressure EGR device 30 is detected, the detection accuracy thereof can be made higher. Here, note that after the processing in step S508, a determination may be made as to whether the EGR ratio difference is larger than its threshold value. That is, if the malfunction of the low pressure EGR device 30 is detected based on both the supercharging pressure and the EGR ratio difference, the detection accuracy thereof can be enhanced to a more extent.

On the other hand, if the determination in step S508 is carried out even in cases where it has become clear that there is no malfunction in the high pressure EGR device 40, the accuracy of detection of the malfunction of the low pressure EGR device 30 can be improved to a much more extent.

In addition, in cases where in place of the step S508, it is determined whether the EGR ratio difference is larger than its threshold value, a determination may be made in combination therewith whether the amount of intake air is in the reference range. This reference range is obtained beforehand through experiments, etc., as a range of the amount of intake air in which a misfire does not occur in the internal combustion engine 1. That is, when a misfire occurs, the EGR ratio difference may be influenced, and hence, in order to enhance the detection accuracy of the malfunction of the low pressure EGR device 30, a determination of the malfunction may be carried out only in cases where no misfire occurs.

Next, FIG. 13 will be described. In steps S601 and S602, the same processings as those in the above-mentioned steps S204 and 205 are carried out.

In step S603, the low pressure EGR valve 32 is adjusted so that it is put to a more closed side than at the present time. In this step, the degree of opening of the low pressure EGR valve 32 is made smaller by means of feedback control based on the amount of intake air. Here, because of the LPL mode, only the degree of opening of the low pressure EGR valve 32 is adjusted. The extent to which the degree of opening of the low pressure EGR valve 32 is decreased may also be a specified value that has been set beforehand, or may also be a value corresponding to the degree of decrease in the amount of intake air.

In step S604, the same processing as that in step S304 is carried out. Then, in step S605, it is determined whether the degree of opening of the low pressure EGR valve 32 is smaller than a threshold value. The threshold value is a lower limit value of a range in which the degree of opening of the low pressure EGR valve 32 can be changed in cases where there is no malfunction in the EGR system. If there is no malfunction in the EGR system, the degree of opening of the low pressure EGR valve 32 will fall in a specified range, whereas if there is a malfunction in the EGR system, the degree of opening of the low pressure EGR valve 32 will fall out of the specified range. This specified range is the same as the specified range in step S305. That is, the threshold value may also be a lower limit of the degree of opening of the low pressure EGR valve 32 within which the EGR system can be said to be normal. Thus, in this step, a determination is made as to whether the degree of opening of the low pressure EGR valve 32 is in a range in which the EGR system can be said to be abnormal. In addition, because the degree of opening of the low pressure EGR valve 32 changes in accordance with the operating state (e.g., the number of engine revolutions per minute and the engine load) of the internal combustion engine 1, the threshold value is also caused to change in accordance with the operating state of the internal combustion engine 1 in a similar manner. In addition, the threshold value is beforehand obtained through experiments, etc. In cases where an affirmative determination is made in step S605, the routine advances to step S606, whereas in cases where a negative determination is made, it is assumed that there is no shortage in the amount of low pressure EGR gas in the LPL mode, and this routine is once terminated.

In steps from S606 to S608, the same processings as those in the above-mentioned steps from S109 to 111 are carried out. Here, note that in step S608, it is determined whether a period of time in which the degree of opening of the low pressure EGR valve 32 is smaller than its threshold value and the EGR ratio difference is larger than its threshold value is longer than a threshold value. In cases where an affirmative determination is made in step S608, the routine advances to step S609, where a determination is made that the low pressure EGR device 30 has a malfunction in which the flow rate of the low pressure EGR gas increases. On the other hand, in cases where a negative determination is made in step S608, it is determined in step S610 that the low pressure EGR device 30 is normal.

As described above, according to this embodiment, in each of the HPL mode, the MPL mode and the LPL mode, the malfunction of the EGR system can be determined. That is, the malfunction of the low pressure EGR device 30 can be detected from the degree of opening of the high pressure EGR valve 42 at the time when the EGR gas is supplied from both the high pressure EGR device 40 and the low pressure EGR device 30, and at the time when the high pressure EGR valve 42 is controlled in a feedback manner so as to direct an amount of EGR gas in a cylinder toward a target range of the EGR gas amount, while performing open loop control of the low pressure EGR valve 32.

Second Embodiment

In this second embodiment, a malfunction of the low pressure EGR device 30 is determined by detecting a change in the angular velocity of a crankshaft at the time when a misfire has occurred in the internal combustion engine 1. The other devices, parts and so on are the same as those in the first embodiment, so the explanation thereof is omitted.

Here, FIG. 14 is a time chart showing the changes over time of the amount of intake air, the degree of opening of the low pressure EGR valve, the degree of opening of the high pressure EGR valve, the supercharging pressure, and the rotational angular velocity of the crankshaft at the time when the amount of the low pressure EGR gas flowing through the low pressure EGR passage 31 decreases to a value less than that at the time of normal operation. A solid line indicates a normal case, and a broken line indicates an abnormal case, i.e., a case in which the amount of the low pressure EGR gas flowing through the low pressure EGR passage 31 has decreased to a value less than that at the time of normal operation.

Here, at the time of the MPL mode, in cases where the low pressure EGR device 30 has a malfunction, and in cases where the amount of low pressure EGR gas decreases, the amount of intake air increases in accordance with the decreasing amount of EGR gas. Even in such a case, the degree of opening of the low pressure EGR valve 32 does not change because of the open loop control thereof. On the other hand, the high pressure EGR valve 42 is caused to increase its degree of opening, so that the amount of high pressure EGR gas is increased so as to decrease the amount of intake air. Then, due to the increased degree of opening of the high pressure EGR valve 42, the amount of gas passing through the turbine 5b is decreased, so the supercharging pressure falls.

When doing so, a misfire may occur due to shortage of the amount of air in a cylinder 2. By detecting the occurrence of the misfire, it can be determined that the low pressure EGR device 30 has a malfunction in which the amount of low pressure EGR gas decreases. For example, because of the occurrence of the misfire, there will not be generated a force to rotate the crankshaft, so the angular velocity of the crankshaft decreases. That is, based on the magnitude of the angular velocity, it can be determined that a misfire is occurring. Then, a difference between an angular velocity at the time of normal operation and a detected angular velocity is taken as an angular velocity difference, and if the angular velocity difference is large, it can be determined that a misfire is occurring. Here, note that an angular velocity is calculated from an output signal of the crank position sensor 16. In addition, the angular velocity difference may be obtained by making a comparison between angular velocities at the time of a specified crank angle, or may be obtained by making a comparison between the maximum values of angular velocities. Also, the occurrence of a misfire may be detected by measuring the pressure in each cylinder 2 in place of the angular velocity of the crankshaft.

Next, FIG. 15 is a time chart showing the changes over time of the amount of intake air, the degree of opening of the low pressure EGR valve, the degree of opening of the high pressure EGR valve, the supercharging pressure, and the EGR ratio difference, at the time when the amount of the high pressure EGR gas flowing through the high pressure EGR passage 41 decreases to a value less than that at the time of normal operation. A solid line indicates a normal case, and a broken line indicates an abnormal case, i.e., a case in which the amount of the high pressure EGR gas flowing through the high pressure EGR passage 41 has decreased to a value less than that at the time of normal operation.

At the time of the MPL mode, in cases where the high pressure EGR device 40 has a malfunction, and in cases where the amount of high pressure EGR gas decreases to a value less than that at the time of normal operation, the amount of intake air increases in accordance with the decreasing amount of EGR gas. At this time, the degree of opening of the low pressure EGR valve 32 does not change because of the open loop control thereof. On the other hand, the high pressure EGR valve 42 is caused to increase its degree of opening, so that the amount of high pressure EGR gas is increased so as to decrease the amount of intake air. However, even if the degree of opening of the high pressure EGR valve 42 is made larger, the amount of the high pressure EGR gas flowing through the high pressure EGR passage 41 will not be increased to a sufficient extent in cases where the high pressure EGR passage 41 is clogged, etc. Therefore, the amount of gas passing through the turbine changes little, so the supercharging pressure does not substantially change, either. Thus, the supercharging pressure does not substantially change, so the amount of intake air does not change, either, as a result of which a misfire does not occur, either. That is, in the MPL mode, it is difficult to determine, even only by looking at the supercharging pressure and the angular velocity of the crankshaft, whether the high pressure EGR device 40 is abnormal.

However, when the amount of high pressure EGR gas decreases, the EGR ratio falls below the target value thereof, so the EGR ratio difference becomes larger. For this reason, the malfunction of the high pressure EGR device 40 can be determined based on the EGR ratio difference. That is, in cases where the amount of the high pressure EGR gas flowing through the high pressure EGR passage 41 decreases to a value less than that at the time of normal operation, the amount of EGR gas becomes insufficient irrespective of the degree of opening of the high pressure EGR valve 42. Therefore, the actual EGR ratio becomes lower than the target value thereof, so the EGR ratio difference becomes larger. For example, if the EGR ratio difference becomes larger than a threshold value, it is determined that the high pressure EGR device 40 has a malfunction. Here, note that the target value of the EGR ratio may have a margin. In this case, when the EGR ratio is out of the target range, the EGR ratio difference becomes larger than the threshold value. In this manner, it is possible to distinguish the malfunction of the low pressure EGR device 30 and the malfunction of the high pressure EGR device 40 from each other.

FIG. 16 is a flow chart showing the flow of determining the malfunction of the EGR system according to this embodiment. This routine is carried out by means of the ECU 20 in a repeated manner at each predetermined time interval.

In steps S701 and S702, the same processings as those in the above-mentioned steps S101 and S102 are carried out. In addition, in step S703, the same processing as that in the above-mentioned step S201 is carried out. Here, note that in this embodiment, the malfunction of the EGR system is determined only at the time of the MPL mode, and in cases where a negative determination is made in step S703, this routine is ended. However, the processing shown in FIG. 8 or FIG. 10 may be carried out in combination therewith.

In steps from S704 to S710, the same processings as those in the above-mentioned steps from S202 to 208 are carried out. In cases where an affirmative determination is made in step S710, the routine advances to step S711, whereas in cases where a negative determination is made, the routine advances to step S717.

In step S711, the angular velocity of the crankshaft is detected. Here, note that because the angular velocity required to detect the malfunction of the EGR system detection need only be obtained, the angular velocity may be detected only at the time of a specified crank angle, or only a maximum value of the angular velocity of the crankshaft may be detected.

Then, in step S712, it is determined whether a difference (i.e., angular velocity difference) between a target value of the angular velocity of the crankshaft and the actual value detected in step S711 is larger than a threshold value. The target value of the angular velocity of the crankshaft is the angular velocity of the crankshaft at the time when no misfire occurs. It may also be the angular velocity of the crankshaft at the time of normal operation. For example, if an amount of decrease of the maximum value of the angular velocity from the target value thereof is larger than a threshold value, it is determined that a misfire has occurred. The threshold value in this case is an upper limit value of a range in which the angular velocity difference can be changed in cases where there is no malfunction in the EGR system. The threshold value is beforehand obtained through experiments, etc. In addition, this threshold value is also set in accordance with the number of engine revolutions per minute and the engine load. In cases where an affirmative determination is made in step S712, the routine advances to step S713, whereas in cases where a negative determination is made, this routine is ended.

In steps from S713 to S716, the same processings as those in the above-mentioned steps from S209 to 212 are carried out. Here, note that in step S714, it is determined whether a period of time, in which the degree of opening of the high pressure EGR valve 42 is larger than its threshold value, the supercharging pressure is lower than its threshold value, and the angular velocity difference is larger than its threshold value, is longer than a threshold value.

Subsequently, in steps from S717 to S721, the same processings as those in the above-mentioned steps from S213 to S217 are carried out.

Here, note that in cases where it has become clear that there is no malfunction in the high pressure EGR device 40, there is no need for the determination of step S710. In this case, in place of the step S710, a determination may be made as to whether the EGR ratio difference is larger than its threshold value. That is, the same processing as that in step S109 may be carried out. In this manner, if the EGR ratio difference is used in combination with the degree of opening of the high pressure EGR valve 42 at the time when the malfunction of the low pressure EGR device 30 is detected, the detection accuracy thereof can be made higher. Here, note that after the processing in step S710, a determination may be made as to whether the EGR ratio difference is larger than its threshold value.

On the other hand, if the processing in step S710 is carried out even in cases where it has become clear that there is no malfunction in the high pressure EGR device 40, the accuracy of detection of the malfunction of the low pressure EGR device 30 can be improved to a much more extent.

As described in the foregoing, according to this embodiment, it is possible to determine, by the presence or absence of a misfire in the internal combustion engine 1, whether there is a malfunction in the low pressure EGR device 30. In addition, it is also possible to distinguish which of the low pressure EGR device 30 and the high pressure EGR device 40 has a malfunction.

EXPLANATION OF REFERENCE NUMERALS AND CHARACTERS

1 Internal Combustion Engine
2 Cylinders
3 Intake Passage
4 Exhaust Passage
5 Turbocharger
5a Compressor
5b Turbine
6 First Intake Throttle Valve
7 Air Flow Meter
8 Intercooler
9 Second Intake Throttle Valve
10 Filter
12 Pressure Sensor
14 Accelerator Pedal
15 Accelerator Opening Sensor
16 Crank Position Sensor
20 ECU
30 Low Pressure EGR Device
31 Low Pressure EGR Passage
32 Low Pressure EGR Valve
33 EGR Cooler
34 Opening Sensor
40 High Pressure EGR Device
41 High Pressure EGR Passage
42 High Pressure EGR Valve
44 Opening Sensor

The invention claimed is:
1. A malfunction detection apparatus for an EGR system comprising:
a turbocharger that has a turbine in an exhaust passage of an internal combustion engine, and has a compressor in an intake passage thereof;
a high pressure EGR device that includes a high pressure EGR passage connecting between the exhaust passage at a location upstream of said turbine and said intake passage, and a high pressure EGR valve for adjusting an amount of EGR gas flowing through said high pressure EGR passage;

a low pressure EGR device that includes a low pressure EGR passage connecting between the exhaust passage at a location downstream of said turbine and said intake passage, and a low pressure EGR valve for adjusting an amount of EGR gas flowing through said low pressure EGR passage; and an opening degree detection device that detects the degree of opening of said high pressure EGR valve;

wherein a detection unit is provided that detects a malfunction of said low pressure EGR device from the degree of opening of said high pressure EGR valve at the time when the EGR gas is supplied from both said high pressure EGR device and said low pressure EGR device, and at the time when said high pressure EGR valve is controlled in a feedback manner so as to direct an amount of EGR gas in a cylinder toward a target range of said amount of EGR gas, while carrying out open loop control of said low pressure EGR valve.

2. The malfunction detection apparatus for an EGR system as set forth in claim 1,
wherein said detection unit makes a determination that there is a malfunction in said low pressure EGR device, when the degree of opening of said high pressure EGR valve is out of a specified range.

3. The malfunction detection apparatus for an EGR system as set forth in claim 1, further comprising:
an intake air amount detection unit that detects an amount of intake air in said internal combustion engine; and
an estimation unit that estimates an EGR ratio which is a ratio of an EGR gas in a gas sucked into the cylinder of said internal combustion engine;
wherein said detection unit determines that there is a malfunction in said low pressure EGR device, when the degree of opening of said high pressure EGR valve is out of a specified range, and when the amount of intake air detected by said intake air amount detection unit is within a reference range of said amount of intake air, and further when the EGR ratio estimated by said estimation unit is out of a target range of said EGR ratio.

4. The malfunction detection apparatus for an EGR system as set forth in claim 3,
wherein said detection unit determines the presence of a malfunction in which the amount of EGR gas flowing through said low pressure EGR passage becomes less than a target range of said amount of EGR gas, when the degree of opening of said high pressure EGR valve is larger than said specified range, and when the amount of intake air detected by said intake air amount detection unit is within a reference range of said amount of intake air, and further when the EGR ratio estimated by said estimation unit is lower than a target range of said EGR ratio.

5. The malfunction detection apparatus for an EGR system as set forth in claim 3,
wherein said detection unit determines the presence of a malfunction in which the amount of EGR gas flowing through said low pressure EGR passage becomes more than a target range of said amount of EGR gas, when the degree of opening of said high pressure EGR valve is smaller than said specified range, and when the amount of intake air detected by said intake air amount detection unit is within a reference range of said amount of intake air, and further when the EGR ratio estimated by said estimation unit is higher than a target range of said EGR ratio.

6. The malfunction detection apparatus for an EGR system as set forth in claim 1, further comprising:
a correlation value acquisition unit that acquires a value correlated with an amount of gas passing through said turbine;
wherein said detection unit determines that there is a malfunction in said low pressure EGR device, when the degree of opening of said high pressure EGR valve is out of a specified range, and when the value acquired by said correlation value acquisition unit indicates that the amount of gas passing through said turbine is out of a reference range of said amount of gas.

7. The malfunction detection apparatus for an EGR system as set forth in claim 6,
wherein said detection unit determines the presence of a malfunction in which the amount of EGR gas flowing through said low pressure EGR passage becomes less than a target range of said amount of EGR gas, when the degree of opening of said high pressure EGR valve is larger than said specified range, and when the value acquired by said correlation value acquisition unit indicates that the amount of gas passing through said turbine is smaller than the reference range of said amount of gas.

8. The malfunction detection apparatus for an EGR system as set forth in claim 6,
wherein said detection unit determines the presence of a malfunction in which the amount of EGR gas flowing through said low pressure EGR passage becomes more than a target range of said amount of EGR gas, when the degree of opening of said high pressure EGR valve is smaller than said specified range, and when the value acquired by said correlation value acquisition unit indicates that the amount of gas passing through said turbine is larger than the reference range of said amount of gas.

9. The malfunction detection apparatus for an EGR system as set forth in claim 6, further comprising:
an estimation unit that estimates an EGR ratio which is a ratio of an EGR gas in a gas sucked into the cylinder of said internal combustion engine;
wherein said detection unit determines the presence of a malfunction in which the amount of EGR gas flowing through said high pressure EGR passage becomes less than a target range of said amount of EGR gas, when the degree of opening of said high pressure EGR valve is larger than said specified range, and when the value acquired by said correlation value acquisition unit indicates that the amount of gas passing through said turbine is within the reference range of said amount of gas, and further when the EGR ratio estimated by said estimation unit is lower than a target range of said EGR ratio.

10. The malfunction detection apparatus for an EGR system as set forth in claim 6, further comprising:
an estimation unit that estimates an EGR ratio which is a ratio of an EGR gas in a gas sucked into the cylinder of said internal combustion engine;
wherein said detection unit determines the presence of a malfunction in which the amount of EGR gas flowing through said high pressure EGR passage becomes more than a target range of said amount of EGR gas, when the degree of opening of said high pressure EGR valve is smaller than said specified range, and when the value acquired by said correlation value acquisition unit indicates that the amount of gas passing through said turbine is smaller than the reference range of said amount of gas, and further when the EGR ratio estimated by said estimation unit is higher than a target range of said EGR ratio.

11. A malfunction detection method for an EGR system comprising:
- a first step of carrying out feedback control of a high pressure EGR valve so as to direct an amount of EGR gas in a cylinder toward a target range of said amount of EGR gas, while carrying out open loop control of a low pressure EGR valve, at the time when EGR gas is supplied from both of a high pressure EGR device and a low pressure EGR device, said high pressure EGR device including a high pressure EGR passage connecting between an exhaust passage at a location upstream of a turbine of said internal combustion engine and an intake passage, and said high pressure EGR valve for adjusting an amount of EGR gas flowing through said high pressure EGR passage, said low pressure EGR device including a low pressure EGR passage connecting between said exhaust passage at a location downstream of said turbine and said intake passage, and said low pressure EGR valve for adjusting an amount of EGR gas flowing through said low pressure EGR passage; and
- a second step of detecting a malfunction of said low pressure EGR device from the degree of opening of said high pressure EGR valve at the time when said first step is carried out.

12. The malfunction detection method for an EGR system as set forth in claim 11,
wherein in said second step, a determination is made that there is a malfunction in said low pressure EGR device, when the degree of opening of said high pressure EGR valve is out of a specified range.

13. The malfunction detection method for an EGR system as set forth in claim 11,
wherein in said second step, a determination is made that there is a malfunction in said low pressure EGR device, when the degree of opening of said high pressure EGR valve is out of a specified range, and when an amount of intake air in an internal combustion engine is within a reference range of said amount of intake air, and further when an EGR ratio which is a ratio of an EGR gas in a gas sucked into a cylinder of said internal combustion engine is out of the target range of said EGR ratio.

14. The malfunction detection method for an EGR system as set forth in claim 11,
wherein in said second step, a determination is made that there is a malfunction in said low pressure EGR device, when the degree of opening of said high pressure EGR valve is out of a specified range, and when a value correlated with an amount of gas passing through said turbine is out of a reference range of said value.

\* \* \* \* \*